US008792152B2

(12) United States Patent
Hino et al.

(10) Patent No.: US 8,792,152 B2
(45) Date of Patent: Jul. 29, 2014

(54) ACTUATOR, LIGHT SCANNER, AND IMAGE FORMING DEVICE

(75) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 169 days.

(21) Appl. No.: 13/561,506

(22) Filed: Jul. 30, 2012

(65) Prior Publication Data

US 2013/0033733 A1 Feb. 7, 2013

(30) Foreign Application Priority Data

Aug. 5, 2011 (JP) ................... 2011-171718

(51) Int. Cl.
*G02B 26/08* (2006.01)
*H02K 33/00* (2006.01)

(52) U.S. Cl.
USPC ........................ 359/224.1; 359/199.3; 310/36

(58) Field of Classification Search
USPC ................. 359/198.1–199.4, 200.6–200.8, 359/213.1–215.1, 224.1–224.2; 310/36, 38
See application file for complete search history.

(56) References Cited

U.S. PATENT DOCUMENTS

| 6,924,914 | B2 | 8/2005 | Kato et al. |
| 7,529,011 | B2 | 5/2009 | Fujii |
| 2009/0231653 | A1* | 9/2009 | Nakamura et al. ......... 359/198.1 |

FOREIGN PATENT DOCUMENTS

| JP | 2003-131161 | 5/2003 |
| JP | 2005-300927 | 10/2005 |
| JP | 2010-079243 | 4/2010 |
| JP | 2012/0243066 | 9/2012 |
| JP | 2012/0257235 | 10/2012 |
| JP | 2012/0257261 | 10/2012 |

* cited by examiner

*Primary Examiner* — James Phan
(74) *Attorney, Agent, or Firm* — Harness, Dickey & Pierce, P.L.C.

(57) ABSTRACT

An actuator includes a movable section swinging around a predetermined swing axis, a connecting section extending from the movable section, and being torsionally deformed in accordance with swing of the movable section, a support section supporting the connecting section, a magnet being disposed on a plate surface of the movable section, and a coil generating a magnetic field acting on the magnet to thereby swing the movable section, and the movable section has a cross shape in a plan view.

20 Claims, 13 Drawing Sheets

ACTUATOR, LIGHT SCANNER, AND IMAGE FORMING DEVICE

BACKGROUND

1. Technical Field

The present invention relates to an actuator, a light scanner, and an image forming device.

2. Related Art

As an actuator, there has been known one using a torsional vibrator (see, e.g., JP-A-2010-79243 (Document 1)). For example, Document 1 discloses a light deflector having a movable plate (a movable section), a support frame (a support section), and a pair of elastic support sections (connecting sections) for supporting the movable plate so as to be torsionally swingable with respect to the support frame, wherein each of the elastic support sections is formed of two rods (beam members).

Such movable plate, support frame, and pair of elastic support sections are formed integrally by anisotropically etching a silicon substrate having a principal surface constituted with a (100) plane of silicon.

Further, in the light deflector according to Document 1, the movable plate has an octagon shape in a plan view. The movable plate having such a planar shape has an advantage that the mass of the movable plate at the position distant from the axis of the swing can be reduced to thereby reduce the inertia moment.

However, in the movable plate having the octagon planar shape, there has been a problem that in the case of manufacturing the movable plate using the anisotropic etching described above, there occurs a large variation in shape due to the relationship with the crystal plane.

SUMMARY

An advantage of some aspects of the invention is to provide an actuator, a light scanner, and an image forming device with which the variation in shape of the movable section in the manufacturing process can be made smaller than in the related art to thereby reduce the inertia moment of the movable section when swinging.

An actuator according to an aspect of the invention includes a movable section swinging around a swing axis, a connecting section extending from the movable section, and being torsionally deformed in accordance with swing of the movable section, a support section supporting the connecting section, a magnet being disposed on a plate surface of the movable section, and a coil generating a magnetic field acting on the magnet to thereby swing the movable section, and the movable section has a cross shape in a plan view.

According to the actuator configured as described above, since the planar shape of the movable section has a cross shape, it is possible to reduce the variation in shape of the movable section in the manufacturing process to thereby reduce the inertia moment of the movable section when swinging.

Further, since the movable section is reinforced by the magnet, the dynamic deflection of the movable section can be reduced. In particular, since the planar shape of the movable section forms the cross shape, even if the displacement of the magnet with respect to the movable section, in particular the displacement in a direction perpendicular to the swing axis of the movable section occurs, the influence exerted by the displacement on the dynamic deflection of the movable section can be reduced.

In the actuator according to the above aspect of the invention, it is preferable that the movable section has the cross shape having a pair of first projecting portions projecting to both sides in a direction perpendicular to the swing axis, and a pair of second projecting portions projecting to both sides in a direction parallel to the swing axis in the plan view, and assuming that a length of the movable section in a direction perpendicular to the swing axis in the plan view is A, a length of each of the first projecting portions in a direction perpendicular to the swing axis in the plan view is "a," and a length of the magnet in a direction perpendicular to the swing axis in the plan view is C, a relationship of $C \geq (A-2a)/4$ is fulfilled.

Thus, the dynamic deflection of the movable section can effectively be reduced.

In the actuator according to the above aspect of the invention, it is preferable that a relationship of $C \leq A-2a$ is fulfilled. Thus, the dynamic deflection of the movable section can more effectively be reduced. Further, in the case of bonding the magnet to the movable section with an adhesive, it is possible to prevent the adhesive from running off onto the side surface of each of the first projecting portions, and the surface on the opposite side to the magnet.

In the actuator according to the above aspect of the invention, it is preferable that assuming that a length of the movable section in a direction parallel to the swing axis in the plan view is B, a length of each of the second projecting portions in a direction parallel to the swing axis in the plan view is "b," and a length of the magnet in a direction parallel to the swing axis in the plan view is D, a relationship of $D \geq (B-2b)/8$ is fulfilled.

Thus, the dynamic deflection of the movable section can effectively be reduced.

In the actuator according to the above aspect of the invention, it is preferable that a relationship of $D \leq B-2b$ is fulfilled. Thus, in the case of bonding the magnet to the movable section with an adhesive, it is possible to prevent the adhesive from running off to each of the connecting sections.

In the actuator according to the above aspect of the invention, it is preferable that a relationship of $D \geq B-2b$ is fulfilled. Thus, the dynamic deflection of the movable section can more effectively be reduced.

In the actuator according to the above aspect of the invention, it is preferable that the magnet has a rectangular shape including a pair of sides parallel to the swing axis and a pair of sides perpendicular to the swing axis in the plan view of the movable section.

Thus, it is possible to effectively reinforce the movable section having a cross planar shape with the magnet.

In the actuator according to the above aspect of the invention, it is preferable that an outer shape of the movable section in the plan view is composed mainly of line segments parallel to the swing axis and line segments perpendicular to the swing axis.

Thus, the variation in shape of the movable section in the manufacturing process can be reduced.

In the actuator according to the above aspect of the invention, it is preferable that the movable section, the support section, and the connecting section are formed of an anisotropically etched silicon substrate.

Thus, it is possible to reduce the variation in shape to thereby easily form the movable section, the support section, and the pair of connecting sections.

In the actuator according to the above aspect of the invention, it is preferable that the plate surface of the movable section is formed of a (100) plane of silicon.

Thus, by anisotropically etching the silicon substrate having the plate surface formed of a (100) plane, it is possible to reduce the variation in shape to thereby form the movable section, the support section, and the pair of connecting sections with ease.

A light scanner according to another aspect of the invention includes a light reflecting section having a light reflectivity, a movable section having the light reflecting section, and swinging around a swing axis, a connecting section extending from the movable section, and being torsionally deformed in accordance with the swing of the movable section, a support section supporting the connecting section, a magnet being disposed on a plate surface of the movable section, and a coil generating a magnetic field acting on the magnet to thereby swing the movable section, and the movable section has a cross shape in a plan view.

According to the light scanner configured as described above, it is possible to reduce the variation in shape of the movable section in the manufacturing process to thereby reduce the inertia moment of the movable section when swinging.

An image forming device according to still another aspect of the invention includes a light source emitting light, and a light scanner scanning the light from the light source, the light scanner includes a light reflecting section having a light reflectivity, a movable section having the light reflecting section, and swinging around a swing axis, a connecting section extending from the movable section, and being torsionally deformed in accordance with swing of the movable section, a support section supporting the connecting section, a magnet being disposed on a plate surface of the movable section, and a coil generating a magnetic field acting on the magnet to thereby swing the movable section, and the movable section has a cross shape in a plan view.

According to the image forming device configured as described above, it is possible to reduce the variation in shape of the movable section in the manufacturing process to thereby reduce the inertia moment of the movable section when swinging. Therefore, a high-quality image can be obtained at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Actuators, light scanners, and image forming devices according to exemplary embodiments of the invention will hereinafter be described with reference to the accompanying drawings. It should be noted that in the present embodiments, the case of applying the actuator according to the invention to the light scanner will be explained as an example.

First Embodiment

Firstly, a light scanner according to a first embodiment of the invention will be explained.

Figure 1:
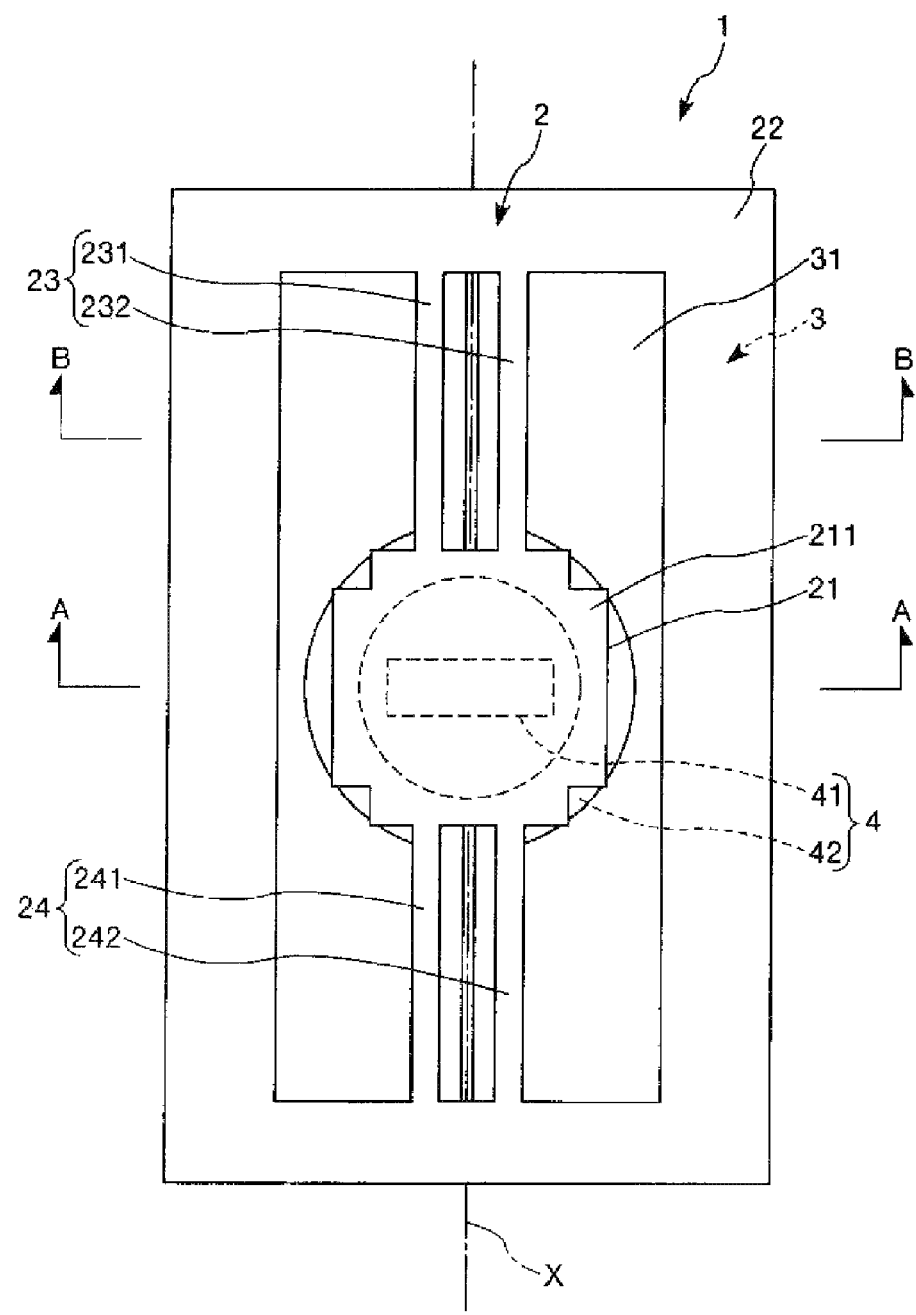
FIG. 1 is a plan view showing a light scanner (an actuator) according to a first embodiment of the invention.
Figure 2:
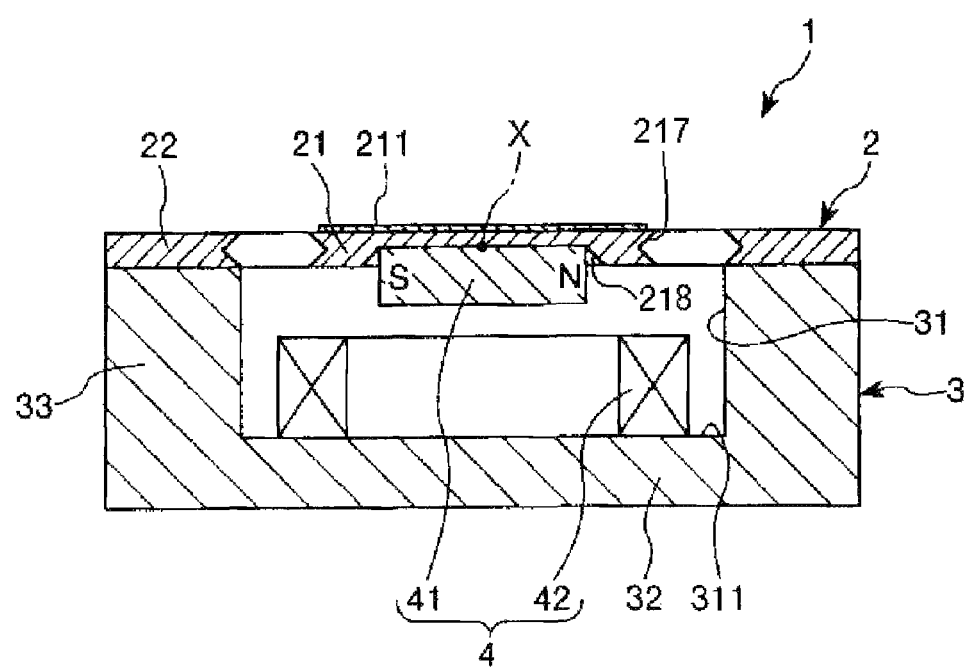
FIG. 2 is a cross-sectional view along the A-A line in FIG. 1.
Figure 3:
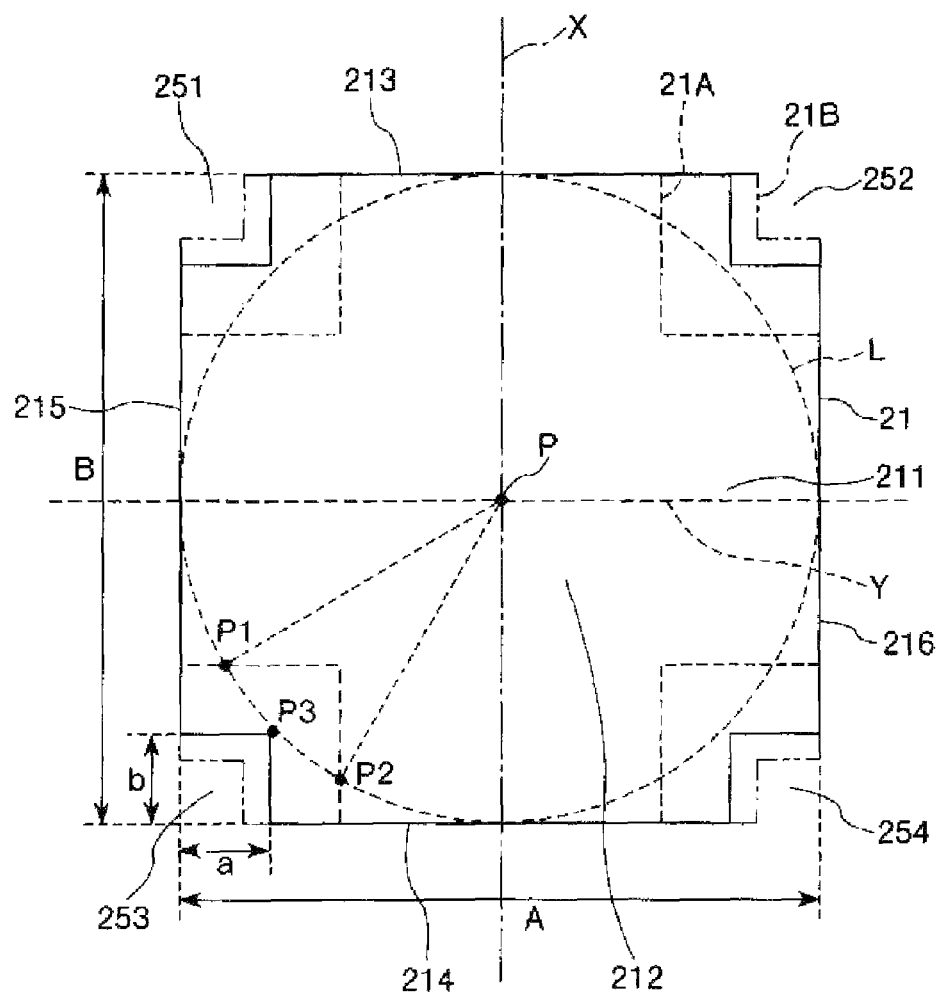
FIG. 3 is a plan view for explaining a movable plate of the light scanner shown in FIG. 1.
Figure 4:
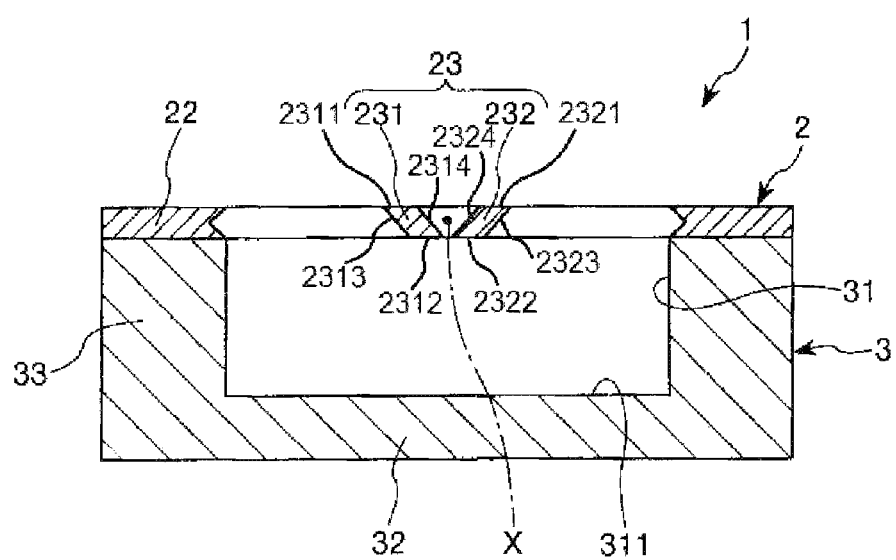
FIG. 4 is a cross-sectional view along the B-B line in FIG. 1.
Figure 5:
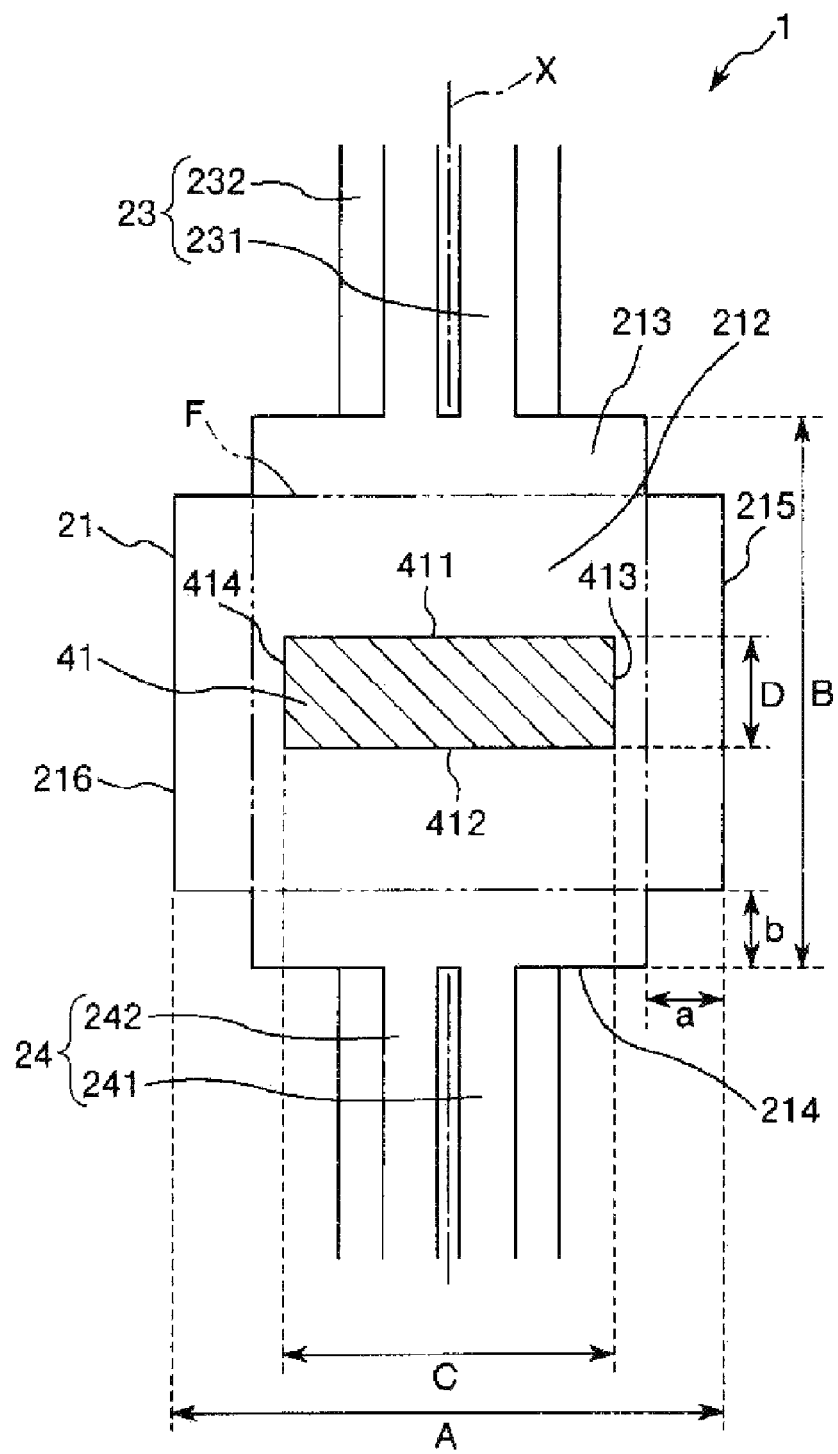
FIG. 5 is a backside view for explaining the movable plate and a magnet of the light scanner shown in FIG. 1.

FIG. 1 is a plan view showing a light scanner (an actuator) according to the first embodiment of the invention, FIG. 2 is a cross-sectional view along the A-A line in FIG. 1, FIG. 3 is a plan view for explaining the movable plate of the light scanner shown in FIG. 1, and FIG. 4 is a cross-sectional view along the B-B line in FIG. 1. Further, FIG. 5 is a backside view for explaining the movable plate and a magnet of the light scanner shown in FIG. 1. Further, FIGS. 6A through 6G, 7A through 7G, and 8A through 8G, are cross-sectional views for explaining a method of manufacturing the light scanner shown in FIG. 1. It should be noted that the upper side of FIGS. 2, 4, 6A through 6G, 7A through 7G, and 8A through 8G is referred to as an "upper side," and the lower side thereof is referred to as a "lower side" in the following descriptions for the sake of convenience of explanation.

As shown in FIG. 1, the light scanner 1 has a substrate 2 having a vibration system, a support member 3 for supporting the substrate 2, and a driving section 4 for vibrating the vibration system of the substrate 2.

Further, the substrate 2 has a movable plate (a movable section) 21 provided with a light reflecting section 211, a pair of connecting sections 23, 24 coupled to the movable plate 21, and a support section 22 for supporting the pair of connecting sections 23, 24. It can also be said that the support section 22 supports the movable plate 21 via the connecting sections 23, 24, and it can also be said that the pair of connecting sections 23, 24 connect the movable plate 21 and the support section 22 to each other.

In such a light scanner 1, the movable plate 21 is made to swing around a predetermined axis along the connecting sections 23, 24 while torsionally deforming each of the connecting sections 23, 24 due to the driving force of the driving section 4. Thus, it is possible to scan the light reflected by the light reflecting section 211 in one predetermined direction. Hereinafter, each of the sections constituting the light scanner 1 will sequentially be explained in detail.

Substrate

As described above, the substrate 2 has the movable plate 21 provided with the light reflecting section 211, the support section 22 for supporting the movable plate 21, and the pair of connecting sections 23, 24 for connecting the movable plate 21 and the support section 22 to each other.

Such a substrate 2 is formed of silicon as a chief material, and the movable plate 21, the support section 22, and the connecting sections 23, 24 are formed integrally. More specifically, as described later in detail, the substrate 2 is formed by anisotropically etching a silicon substrate having a plate surface constituted with a (100) plane of silicon. By such anisotropic etching, the movable plate 21, the support section 22, and the pair of connecting sections 23, 24 can be formed with ease and accuracy using a (111) plane of silicon as an etch stop layer. It should be noted that as the silicon substrate, a single-crystal silicon substrate is used commonly.

Further, the upper surface and the lower surface of such a substrate 2 are each formed of a (100) plane of silicon. Further, among inner peripheral surfaces of the support section 22, side surfaces of the movable plate 21, and side surfaces of each of the connecting sections 23, 24, the parts parallel to the axis line X are each formed of a (111) plane of silicon.

Further, since silicon is light in weight, and has rigidity as high as SUS, by constituting the substrate 2 using silicon as a chief material, the substrate 2 having superior vibration characteristics can be obtained. Further, since silicon can be processed by etching with high dimensional accuracy as described later, by forming the substrate 2 using the silicon substrate, the substrate 2 having a desired shape (desired vibration characteristics) can be obtained.

The substrate 2 will hereinafter be described in further detail.

As shown in FIG. 1, the support section 22 has a frame-like shape. More specifically, the support section 22 has a quadrangular ring shape. Such a support section 22 supports the movable plate 21 via the pair of connecting sections 23, 24. It should be noted that the shape of the support section 22 is not particularly limited providing the support section 22 can support the movable plate 21 via the pair of connecting sections 23, 24, and can be, for example, a shape divided in accordance with the connecting sections 23, 24.

Inside the support section 22 described above, there is disposed the movable plate 21.

The movable plate 21 has a plate-like shape. Further, in the present embodiment, the movable plate 21 has a shape (a cross shape) obtained by cutting off the four corners of a rectangle (a square in the present embodiment) in a plan view (hereinafter also referred to simply as "plan view") from the thickness direction of the movable plate 21. Thus, it is possible to reduce the inertia moment of the movable plate 21 when swinging while sufficiently keeping the area (light reflecting area) of the light reflecting section 211 in the upper surface of the movable plate 21. Further, by anisotropically etching the silicon substrate as described later in detail, such a movable plate 21 can be formed with ease and accuracy.

Further, as described later, in the case of fixing a permanent magnet 41 on the movable plate 21, even if there occurs a displacement of the permanent magnet 41 with respect to the movable plate 21, in particular a displacement in a direction perpendicular to the swing axis (the axis line X) of the movable plate 21, it is possible to reduce the influence of the displacement exerted on the dynamic deflection of the movable plate 21. This is derived from the fact that an extra mass appropriately exists at an end portion distant from the swing axis (the axis line X) of the movable plate 21. In contrast, if the planar shape of the movable plate 21 is, for example, a circular shape or a octagon shape, since the mass at the end portion distant from the swing axis (the axis line X) of the movable plate 21 is too small, if a displacement of the permanent magnet 41 occurs in a direction perpendicular to the swing axis (the axis line X) of the movable plate 21, the influence of the displacement is significant.

In a more specific explanation, as shown in FIG. 3, the movable plate 21 is composed of a main body section 212, a pair of projecting portions 213, 214 (second projecting portions) projecting to both sides from the main body section 212 in a direction parallel to the axis line X, and a pair of projecting portions 215, 216 (first projecting portions) projecting to both sides from the main body section 212 in a direction (a direction parallel to a line segment Y) perpendicular to the axis line X. Thus, the movable plate 21 forms the cross shape in the plan view from the thickness direction.

Further, between the projecting portion 213 and the projecting portion 215 in a direction along the outer periphery of the movable plate 21, there is formed a cutout 251. Further, between the projecting portion 213 and the projecting portion 216 in a direction along the outer periphery of the movable plate 21, there is formed a cutout 252. Further, between the projecting portion 214 and the projecting portion 216 in a direction along the outer periphery of the movable plate 21, there is formed a cutout 254. Further, between the projecting portion 214 and the projecting portion 215 in a direction along the outer periphery of the movable plate 21, there is formed a cutout 253.

In other words, in the plan view from the thickness direction of the movable plate 21, the cutout 251, the projecting portion 213, the cutout 252, the projecting portion 216, the cutout 254, the projecting portion 214, the cutout 253, the projecting portion 215 are disposed side by side along the outer periphery of the movable plate 21 in this order.

Further, the cutout 251 and the cutout 252 are opposed to each other via the projecting portion 213. Further, the cutout 252 and the cutout 254 are opposed to each other via the projecting portion 216. Further, the cutout 253 and the cutout 254 are opposed to each other via the projecting portion 214. Further, the cutout 251 and the cutout 253 are opposed to each other via the projecting portion 215.

Such projecting portions 213 through 216 and cutouts 251 through 254 each have a rectangular shape in the plan view from the thickness direction of the movable plate 21. It should be noted that FIGS. 1 and 3 show the state in which the planar shape of each of the cutouts 251 through 254 forms a square shape as an example. Since in the corner portions in the cross outer shape of the movable plate 21, there appears a plurality of crystal planes in addition to the predetermined crystal plane, the corner portions are not exactly right-angle, and therefore, the cutouts 251 through 254 do not have a rectangular shape in a precise sense. However, in the present embodiment, it is assumed that the cutouts 251 through 254 have a rectangular shape including the state described above.

Such an outer shape in the plan view from the thickness direction of the movable plate 21 is composed mainly of line segments parallel to the swing axis (the axis line X) of the movable plate 21, and line segments (line segments Y) perpendicular to the swing axis (the axis line X) of the movable plate 21. Thus, by anisotropically etching the silicon substrate as described later, the movable plate 21 can be formed with ease and accuracy. It should be noted that in the corner portions in the cross outer shape of the movable plate 21, there appears a plurality of crystal planes in addition to the predetermined crystal plane. Therefore, the outer shape of the corner portions in the plan view from the thickness direction of the movable plate 21 is not necessarily composed of line segments parallel to the axis line X or the line segment Y. In other words, the outer shape in the plan view from the thickness direction of the movable plate 21 is composed of line segments parallel to the axis line X and line segments parallel to the line segment Y except at least the corner portions of the movable plate 21 described above.

Further, the movable plate 21 forms a shape symmetric about the swing axis (the axis line X) of the movable plate 21 in the plan view. Thus, it is possible to easily locate the centroid of the movable plate 21 on the swing axis of the movable plate 21 to thereby smooth the swing motion of the movable plate 21.

Further, the movable plate 21 forms a shape symmetric about the line segment Y, which passes through the center P of the movable plate 21 and is perpendicular to the swing axis (the axis line X) of the movable plate 21 in the plan view. Thus, the movable plate can easily be designed.

Further, the plate surface of the movable plate 21 is formed of a (100) plane of silicon. Thus, by anisotropically etching the silicon substrate having the plate surface formed of a (100) plane as described later, it is possible to form the movable plate 21, the support section 22, and the pair of connecting sections 23, 24 with ease and accuracy.

Further, the side surface of the movable plate 21 is formed mainly of a (111) plane of silicon. Thus, by anisotropically etching the silicon substrate having the plate surface formed of a (100) plane as described later, it is possible to form the movable plate 21, the support section 22, and the pair of connecting sections 23, 24 with ease and accuracy using the (111) plane of silicon as an etch stop layer. It should be noted that in the corner portions of the outer shape in the plan view from the thickness direction of the movable plate 21, the side surface of the movable plate 21 includes crystal planes other than the (111) plane. Therefore, the side surface of the movable plate 21 is formed of a (111) plane of silicon except at least the side surface in the corner portions.

Further, the side surface of the movable plate 21 is provided with a groove 217 having a V-shaped cross-section. Thus, the inertia moment of the movable plate 21 can be reduced. Further, by anisotropically etching the silicon substrate having the plate surface formed of a (100) plane, it is possible to form such a groove with ease and accuracy using the (111) plane of silicon as the etch stop layer.

Further, assuming that the length of the movable plate 21 in a direction (hereinafter also referred to as a "line segment Y direction") perpendicular to the swing axis (the axis line X) in the plan view from the thickness direction of the movable plate 21 is A, the length of the movable plate 21 in a direction (hereinafter also referred to as a "axis line X direction") parallel to the swing axis (the axis line X) of the movable plate 21 is B, the length of each of the cutouts 251 through 254 along the line segment Y direction is "a," and the length of each of the cutouts 251 through 254 along the axis line X direction is "b," the formulas (A), (B) below are fulfilled.

$$0.8 \times \left\{ \frac{1}{2}\left(A - \sqrt{\frac{1}{\frac{3}{A^2} + \frac{1}{B^2}}}\right) \right\} \le a \le 2.0 \times \left\{ \frac{1}{2}\left(A - \sqrt{\frac{1}{\frac{1}{3A^2} + \frac{1}{B^2}}}\right) \right\} \quad (A)$$

$$0.8 \times \left\{ \frac{1}{2}\left(B - \sqrt{\frac{1}{\frac{1}{3A^2} + \frac{1}{B^2}}}\right) \right\} \le b \le 2.0 \times \left\{ \frac{1}{2}\left(B - \sqrt{\frac{1}{\frac{3}{A^2} + \frac{1}{B^2}}}\right) \right\} \quad (B)$$

By fulfilling the formulas (A), (B) described above, it is possible to efficiently reduce the inertia moment of the movable plate 21 when swinging while keeping the area necessary for the light reflection by the light reflecting section 211 of the movable plate 21.

In contrast, if the lengths "a," "b" are smaller than the respective lower limit values described above, the effect of reducing the inertia moment of the movable plate 21 when swinging tends to be weaker. Therefore, there is a case in which the dynamic deflection of the movable plate 21 increases to thereby degrade the optical characteristics of the light scanner 1 depending on the thickness of the movable plate 21. On the other hand, if the lengths "a," "b" exceeds the respective upper limit values, it is not achievable to effectively use the area of the light reflecting section 211 of the movable plate 21, and there appears the tendency of decreasing the intensity of the reflected light in the light reflecting section 211.

It should be noted that in FIG. 3 the movable plate 21A in the case of fulfilling the formulas (A), (B) described above, and setting "a" and "b" to the maximum values is indicated by the chain lines, and the movable plate 21B in the case of fulfilling the formulas, and setting "a" and "b" to the minimum values is indicated by the dashed-two dotted lines.

Hereinafter, the formulas (A), (B) described above will briefly be explained.

In the case in which a circular or elliptical spot of the light L is inscribed in the movable plate 21 in the plan view as shown in FIG. 3, each of the cutouts 251 through 254 located outside the spot of the light L has the largest area when the conditions of $a=(1-1/\sqrt{2})A$, $b=(1-1/\sqrt{2})B$ are fulfilled.

Further, in this case, "a" takes a maximum value and "b" takes a minimum value in the range where the effect of forming the cutouts 251 through 254 is appropriately exerted when a corner P3 of each of the cutouts 251 through 254 is located at an intersection P2 between a line segment tilted 30° from the axis line X and the outer peripheral edge of the spot of the light L.

Further, in this case, "a" takes a minimum value and "b" takes a maximum value in the range where the effect of forming the cutouts 251 through 254 is appropriately exerted when the corner P3 of each of the cutouts 251 through 254 is located at an intersection P1 between a line segment tilted 60° from the axis line X and the outer peripheral edge of the spot of the light L.

Further, the effective range of the spot diameter of the laser usually used as the light L is commonly considered to be the range equal to or higher than $1/e^2$ of the peak intensity. Therefore, if the effective range falls within the light reflecting section 211, ideal light reflection can be performed.

It should be noted that in an actual laser some light exists even outside the effective range, and if a and b are slightly smaller or larger than the values described above, "a" and "b" can be allowed in practical use without problems.

Specifically, the allowable values of "a" and "b" obtained as described above can be set to not lower than −20% and not higher than +200%.

According to the above, the formulas (A), (B) can be obtained. On the upper surface of the movable plate 21 there is disposed the light reflecting section 211 having a light reflecting property. On the other hand, on the lower surface of the movable plate 21, there is disposed the permanent magnet 41 of the driving section 4 described later. It should be noted that the permanent magnet 41 will be described in detail in the explanation of the driving section 4 described later. Each of the connecting sections 23, 24 has a longitudinal shape elongated along the axis line X, and is configured to be elastically deformable. Further, the connecting section 23 and the connecting section 24 are opposed to each other via the movable plate 21. Such connecting sections 23, 24 each connect the movable plate 21 and the support section 22 to each other so as to make the movable plate 21 swingable with respect to the support section 22. The pair of connecting sections 23, 24 are disposed coaxially along the axis line X, and the movable plate 21 swings with respect to the support section 22 taking the axis line X as the swing axis.

As shown in FIG. 1, in the present embodiment, the connecting section 23 is composed of a pair of beam members 231, 232. Similarly, the connecting section 24 is composed of a pair of beam members 241, 242. Hereinafter, the connecting section 23 will representatively be explained, and the connecting section 24 is substantially the same as the connecting section 23, and therefore, the explanation therefor will be omitted. The beam members 231, 232 are disposed along the axis line X, and opposed to each other via the axis line X. Further, the cross-sectional shape of each of the beam members 231, 232 along a plane perpendicular to the axis line X forms a parallelogram. More specifically, the outer shape of the cross-section of each of the beam members 231, 232 forms a parallelogram composed of a pair of sides along a (100) plane of silicon, and a pair of sides along a (111) plane of silicon. In other words, the beam member 231 has an upper surface 2311 and a lower surface 2312 each formed of a (100) plane of silicon, and a pair of side surfaces 2313, 2314 each formed of a (111) plane of silicon. Similarly, the beam member 232 has an upper surface 2321 and a lower surface 2322 each formed of a (100) plane of silicon, and a pair of side surfaces 2323, 2324 each formed of a (111) plane of silicon. Here, since the side surfaces 2313, 2314, 2323, and 2324 are each formed of the (111) plane of silicon, the tilt angle θ thereof with respect to the upper surface or the lower surface (i.e., the (100) plane of silicon) of the substrate 2 is 54.73°. Each of the beam members 231, 232 having such a cross-sectional shape can be formed easily and reliably by anisotropically etching a silicon substrate having a plate surface constituted with a (100) plane of silicon.

If the outer surfaces of the connecting section 23 are constituted with the (100) plane and the (111) plane of silicon as described above, it is possible to form the connecting section 23 with ease and accuracy using the (111) plane of silicon as the etch stop layer as described later.

Further, when viewed from a direction parallel to the axis line X (in other words, in the cross-sectional view shown in FIG. 4) the beam members 231, 232 have a shape symmetric about a line segment extending vertically, and passing through the axis line X.

Further, in the cross-sectional view shown in FIG. 4, the total width (a face-to-face distance between the side surface 2313 of the beam member 231 and the side surface 2323 of the beam member 232) of the connecting section 23 increases in a direction from the lower side toward the upper side. Further, in the cross-sectional view shown in FIG. 4, the distance (the width of the gap) between the beam member 231 and the beam member 232 increases in a direction from the lower side toward the upper side.

In other words, when viewed from a direction parallel to the swing axis of the movable plate 21, the distance between the pair of beam members 231, 232 gradually increases in a direction from one surface side of the movable plate 21 toward the other surface side thereof (in the present embodiment, from the lower side toward the upper side).

Support Member

The support member 3 has a function of supporting the substrate 2 described above. Further, the support member 3 also has a function of supporting the coil 42 of the driving section 4 described later.

The support member 3 forms a box-like shape having a recessed section 31 opened upward. In other words, the support member 3 is composed of a plate-like section 32 having a plate-like shape, and a frame-like section 33 having a frame-like shape disposed along the outer peripheral portion of the upper surface of the plate-like section 32.

To the part outside the recessed section 31 out of the upper surface of the support member 3, namely the upper surface of the frame-like section 33, there is bonded the lower surface of the support section 22 of the substrate 2 described above. Thus, a space for allowing the swing motion of the movable plate 22 is formed between the movable plate 21, the pair of connecting sections 23, 24 of the substrate 2, and the support member 3.

The constituent material of such a support member 3 is not particularly limited, but there can be cited glass material such as quartz glass, Pyrex glass ("Pyrex" is a registered trademark), and Tempax glass ("Tempax" is a registered trademark), silicon material such as single-crystal silicon and polysilicon, and low-temperature cofired ceramics (LTCC), and so on.

Further, the bonding method of the substrate 2 and the support member 3 is appropriately determined in accordance with the constituent material, the shape, and so on of the support member 3, and is not particularly limited. A method of using an adhesive, an anodic bonding method, a direct bonding method, and so on can be cited as the bonding method.

Driving Section

The driving section 4 has the permanent magnet 41 and the coil 42, and is for swing-driving the movable plate 21 of the substrate 2 described above using an electromagnetic drive method (more specifically, a moving-magnet electromagnetic drive method). The electromagnetic drive method allows the driving section 4 to generate high drive power. Therefore, according to the driving section 4 adopting the electromagnetic drive method, it is possible to enlarge the deflection angle of the movable plate 21 while achieving reduction in drive voltage.

The permanent magnet 41 is fixed (bonded) to the lower surface of the movable plate 21 via, for example, an adhesive.

Further, the permanent magnet 41 has an elongated shape, and is disposed so as to extend in a direction perpendicular to the axis line X in a plan view. Such a permanent magnet 41 is magnetized in the longitudinal direction, and one side thereof in the longitudinal direction is magnetized to an N pole while the other side is magnetized to an S pole. By disposing the permanent magnet 41 so as to extend in a direction perpendicular to the axis line X, it is possible to locate the both end portions of the permanent magnet 41 at places distant from the axis line X. Therefore, due to the effect of the magnetic field generated by the coil 42, it is possible to provide higher torque to the movable plate 21.

Further, the permanent magnet 41 also has a function of reinforcing the movable plate 21. Thus, the dynamic deflection of the movable plate 21 can be reduced.

Further, as shown in FIG. 5, assuming that the length of the movable plate 21 in a direction perpendicular to the swing axis (the axis line X) in the plan view from the thickness direction of the movable plate 21 is A, the length of each of the projecting portions 215, 216 in a direction perpendicular to the swing axis (the axis line X) in the plan view from the thickness direction of the movable plate 21 is "a," and the length of the permanent magnet 41 in a direction perpendicular to the swing axis (the axis line X) in the plan view from the thickness direction of the movable plate 21 is C, the relationship of $C \geq (A-2a)/4$ is fulfilled. Thus, the dynamic deflection of the movable plate 21 can effectively be reduced. In contrast, in the case in which the relationship of $C < (A-2a)/4$ is fulfilled, the effect of the permanent magnet 41 reinforcing the movable plate 21 is not obtained. Further in the case in which the relationship of $C<(A-2a)/4$ is fulfilled, if it is attempted to obtain the necessary magnetic force of the permanent magnet 41, the thickness of the permanent magnet 41 grows too large, and the centroid of the mass consisting of the movable plate 21 and the permanent magnet 41 is significantly shifted from the axis line X to thereby incur degradation of the vibration characteristics of the movable plate 21.

In particular, the relationship of $C<A-2a$ is fulfilled. In other words, the length of the permanent magnet 41 in a direction perpendicular to the axis line X in the plan view from the thickness direction of the movable plate 21 is shorter than the length of the main body section 212 (the area of F indicated by the dashed-two dotted line in FIG. 5) in a direction perpendicular to the axis line X in the plan view from the thickness direction of the movable plate 21. Thus, the mass of the end portion of the movable plate 21 distant from the axis line X can be reduced. As a result, the dynamic deflection of the movable plate 21 can more effectively be reduced. Further, in the case of bonding the permanent magnet 41 to the movable plate 21 with an adhesive, it is possible to prevent the adhesive from running off onto the side surface of each of the projecting portions 215, 216 and the surface on the opposite side to the permanent magnet 41.

Further, assuming that the length of the movable plate 21 in a direction parallel to the axis line X in the plan view from the thickness direction of the movable plate 21 is B, the length of each of the projecting portions 213, 214 in a direction parallel to the axis line X in the plan view from the thickness direction of the movable plate 21 is "b," and the length of the permanent magnet 41 in a direction parallel to the axis line X in the plan view from the thickness direction of the movable plate 21 is D, the relationship of $D \geq (B-2b)/8$ is fulfilled. Thus, the dynamic deflection of the movable plate 21 can effectively be reduced.

In contrast, in the case in which the relationship of $D<(B-2b)/8$ is fulfilled, the effect of the permanent magnet 41 reinforcing the movable plate 21 is not obtained. Further in the case in which the relationship of $D<(B-2b)/8$ is fulfilled, if it is attempted to obtain the necessary magnetic force of the permanent magnet 41, the thickness of the permanent magnet 41 grows too large, and the centroid of the mass consisting of the movable plate 21 and the permanent magnet 41 is significantly shifted from the axis line X to thereby incur degradation of the vibration characteristics of the movable plate 21.

In particular, the relationship of $D<B-2b$ is fulfilled. In other words, the length of the permanent magnet 41 in a direction parallel to the axis line X in the plan view from the thickness direction of the movable plate 21 is shorter than the length of the main body section 212 (the area of F indicated by the dashed-two dotted line in FIG. 5) in a direction parallel to the axis line X in the plan view from the thickness direction of the movable plate 21. Thus, in the case of bonding the permanent magnet 41 to the movable plate 21 with an adhesive, it is possible to prevent the adhesive from running off to each of the connecting sections 23, 24.

Here, the permanent magnet 41 forms a rectangle including a pair of sides 411, 412 perpendicular to the axis line X and a pair of sides 413, 414 parallel to the axis line X in the plan view from the thickness direction of the movable plate 21. Thus, it is possible to effectively reinforce the movable plate 21 having a cross planar shape as described above with the permanent magnet 41. It should be noted that the planar shape of the permanent magnet 41 is not limited to one shown in the drawing, but can form, for example, a circular shape or an elliptical shape, or can form other polygonal shapes such as a triangular shape or a pentagon shape.

The material of such a permanent magnet 41 is not particularly limited, and the magnet obtained by magnetizing a hard magnetic material such as neodymium magnet, ferrite magnet, samarium-cobalt magnet, alnico magnet, or bond magnet can preferably be used.

The coil 42 is disposed on a bottom surface 311 of the recessed section 31 of the support member 3 so as to be opposed to the movable plate 21. Thus, the coil 42 is fixedly disposed so as to have a gap with the movable plate 21, and it is possible to make the magnetic field generated by the coil 42 effectively act on the permanent magnet 41. The coil 42 is electrically connected to a power supply not shown, and is arranged so that a voltage (e.g., an alternating voltage, or an intermittent direct current) varying periodically is applied from the power supply. Further, the coil 42 generates the magnetic field acting on the permanent magnet 41 in response to energization to thereby swing the movable plate 21.

Such a driving section 4 swings the movable plate 21 in the following manner.

Firstly, the power supply not shown applies, for example, an alternating voltage to the coil 42. Thus, a first magnetic field of setting the upper side (the movable plate 21 side) of the coil 42 to the N pole while setting the lower side to the S pole, and a second magnetic field of setting the upper side of the coil 42 to the S pole while setting the lower side to the N pole are generated alternately and periodically.

In the first magnetic field, the S-pole side of the permanent magnet 41 is attracted by the coil 42, and the movable plate 21 swings counterclockwise in FIG. 2 around the axis line X so that the N-pole side reversely moves away from the coil 42 (a first state). In contrast, in the second magnetic field, the N-pole side of the permanent magnet 41 is attracted by the coil 42, and the movable plate 21 swings clockwise in FIG. 2 around the axis line X so that the S-pole side reversely moves away from the coil 42 (a second state). The first state and the second state described above are alternately repeated, and the movable plate 21 swings around the axis line X.

Method of Manufacturing Actuator

The light scanner 1 described above can be manufactured in, for example, the following process. Hereinafter, a method of manufacturing the light scanner 1 will be explained with reference to FIGS. 6A through 6G, 7A through 7G, and 8A through 8G as an example of a method of manufacturing an actuator according to the invention. It should be noted that FIGS. 6A through 6G, 7A through 7G, and 8A through 8G are each a cross-sectional view corresponding to FIG. 2.

The method of manufacturing the light scanner 1 includes a process of forming the substrate 2.

The process of forming the substrate 2 includes a process (A) of forming a recessed section 218, and a process (B) of forming the movable plate 21, the support section 22, and the pair of connecting sections 23, 24.

Hereinafter, each of the processes will sequentially be explained in detail.

A. Process of Forming Recessed Section 218

—A1—

Figure 6A:
FIGS. 6A through 6G are cross-sectional views for explaining a method of manufacturing the light scanner shown in FIG. 1.

Firstly, as shown in FIG. 6A, a silicon substrate 102 is prepared.

The silicon substrate 102 forms the substrate 2 after going through an etching process described later.

Specifically, the silicon substrate 102 has the principal surface formed of a (100) plane of silicon.

—A2—

Figure 6B:
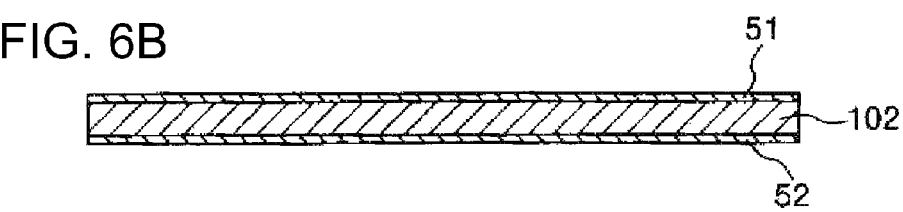

Subsequently, as shown in FIG. 6B, a nitride film 51 is formed on the upper surface of the silicon substrate 102, and a nitride film 52 is formed on the lower surface of the silicon substrate 102.

The nitride films 51, 52 are each formed of, for example, SiN. Further, the method of forming the nitride films 51, 52 is not particularly limited, and a vapor-phase deposition method such as plasma CVD can be used.

Further, the thickness of the nitride films 51, 52 is not particularly limited, and is roughly in a range not smaller than 0.01 μm and not greater than 0.2 μm.

It should be noted that it is also possible to form oxide films formed of SiO using, for example, a thermal oxidation method instead of the nitride films 51, 52.

—A3—

Figure 6C:
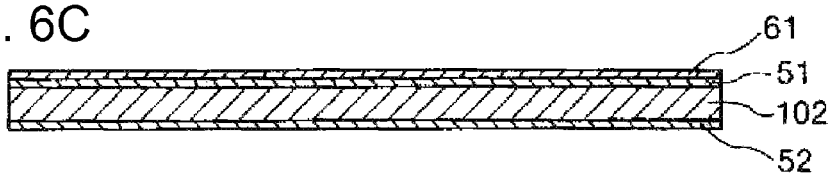
Figure 6D:
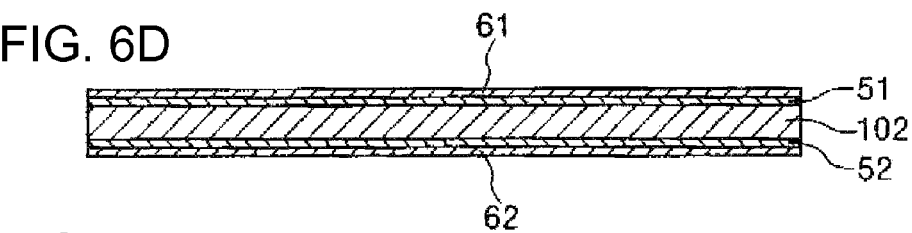

Subsequently, a resist film 61 is formed on the nitride film 51 as shown in FIG. 6C, and a resist film 62 is formed on the nitride film 52 as shown in FIG. 6D.

The resist films 61, 62 are each formed of a positive or negative resist material.

—A4—

Figure 6E:
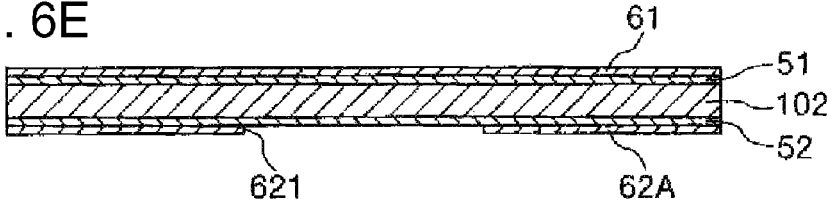

Subsequently, by exposing and then developing the resist film 62, the part of the resist film 62 corresponding to a formation area of the recessed section 218 is removed. Thus, as shown in FIG. 6E, the resist film 62A having an opening 621 is obtained.

—A5—

Figure 6F:
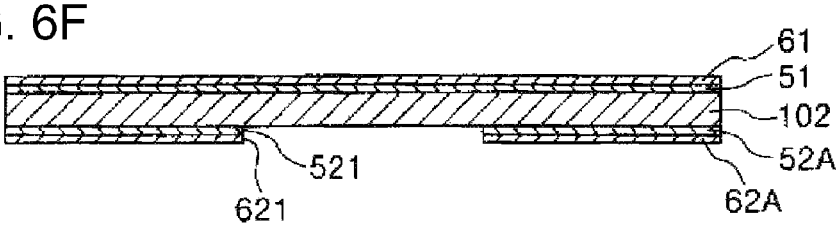

Subsequently, a part of the nitride film 52 is removed by etching using the resist film 62A as a mask. Thus, as shown in FIG. 6F, the nitride film 52A having an opening 521 is obtained.

The etching process (the method of forming the opening 521) is not particularly limited, and there can be cited, for example, reactive ion etching (RIE), and dry etching using $CF_4$.

—A6—

Figure 6G:
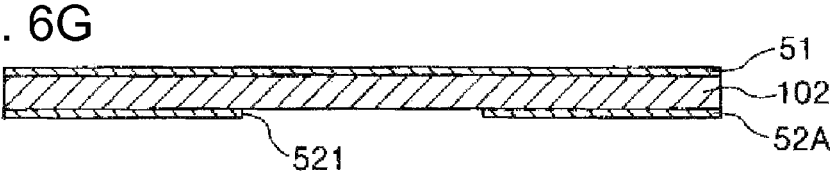

Subsequently, the resist films 61, 62A are removed. Thus, as shown in FIG. 6G, the silicon substrate 102 is in the state in which the upper surface thereof is covered by the nitride film 51, and the lower surface thereof is covered by the nitride film 52A.

The method of removing the resist films 61, 62A is not particularly limited, and there can be cited, for example, washing with sulfuric acid and $O_2$ ashing.

—A7—

Figure 7A:
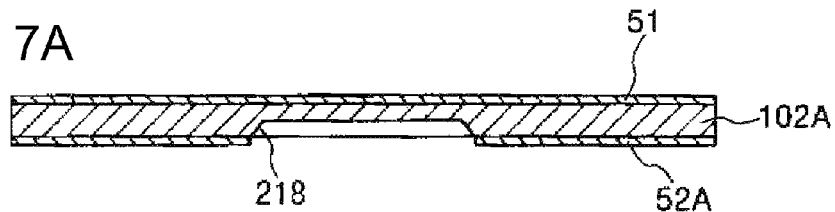
FIGS. 7A through 7G are cross-sectional views for explaining the method of manufacturing the light scanner shown in FIG. 1.

Subsequently, the silicon substrate 102 is etched using the nitride film 52A as a mask. Thus, as shown in FIG. 7A, the silicon substrate 102A having the recessed section 218 is obtained.

The etching process (the method of forming the recessed section 218) is not particularly limited, and similarly to the etching process for forming the movable plate 21, the support section 22, and so on, anisotropic etching is used preferably.

The anisotropic etching is not particularly limited, and can be realized by wet etching using, for example, a KOH solution.

—A8—

Figure 7B:
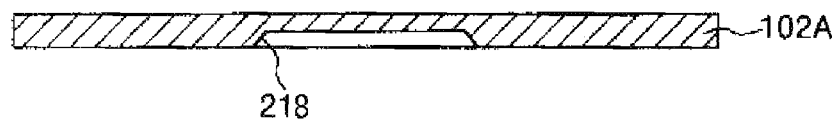

Subsequently, the nitride films 51, 52A are removed. Thus, as shown in FIG. 7B, there is obtained the state in which the upper surface and the lower surface of the silicon substrate 102A are exposed.

The method of removing the nitride films 51, 52A is not particularly limited, and there can be cited, for example, reactive ion etching (RIE), and dry etching using $CF_4$ similarly to the process A5 described above.

B. Process of Forming Movable Plate 21, Support Section 22 etc.

—B1—

Figure 7C:
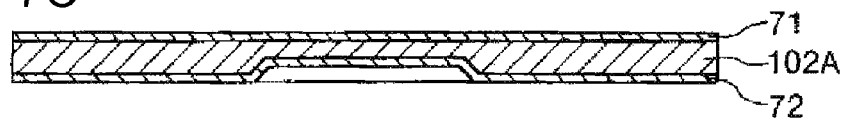

Subsequently, as shown in FIG. 7C, a nitride film 71 is formed on the upper surface of the silicon substrate 102A, and a nitride film 72 is formed on the lower surface of the silicon substrate 102A.

The nitride films 71, 72 are each formed of, for example, SiN. Further, the method of forming the nitride films 71, 72 is not particularly limited, and a vapor-phase deposition method such as plasma CVD can be used similarly to the process A2 described above.

Further, the thickness of the nitride films 71, 72 is not particularly limited, and is roughly in a range not smaller than 0.01 μm and not greater than 0.3 μm.

It should be noted that it is also possible to form oxide films formed of SiO using, for example, a thermal oxidation method instead of the nitride films 71, 72.

—B2—

Figure 7D:
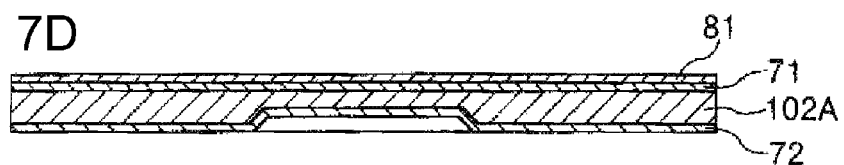

Subsequently, as shown in FIG. 7D, a resist film 81 is formed on the nitride film 71.

The resist film 81 is formed of a positive or negative resist material.

—B3—

Figure 7E:
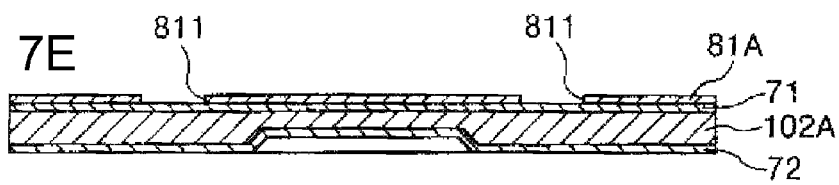

Subsequently, by exposing and then developing the resist film 81, the resist film 81 is partially removed so that there remain the parts of the resist film 81 respectively corresponding to forming areas of the movable plate 21, the support section 22, and the pair of connecting sections 23, 24. Thus, as shown in FIG. 7E, the resist film 81A having openings 811 is obtained. It should be noted that although not shown in FIG. 7E, the resist film 81A is also provided with an opening formed corresponding to the gap between the upper ends of the pair of beam members 231, 232.

—B4—

Figure 7F:
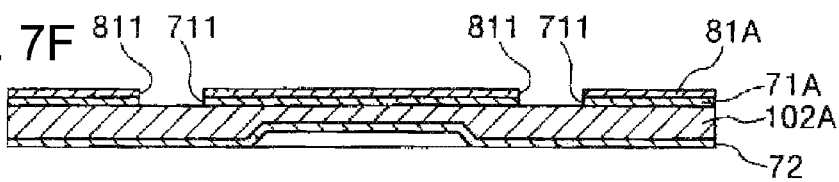

Subsequently, the nitride film 71 is partially removed by etching using the resist film 81A as a mask. Thus, as shown in FIG. 7F, the nitride film 71A having openings 711 is obtained. It should be noted that although not shown in FIG. 7F, the nitride film 71A is also provided with an opening formed corresponding to the gap between the upper ends of the pair of beam members 231, 232.

The etching process (the method of forming the openings 711) is not particularly limited, and there can be cited, for example, reactive ion etching (RIE), and dry etching using $CF_4$ similarly to the process A5 described above.

—B5—

Figure 7G:
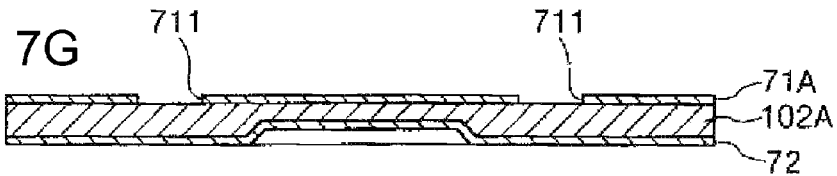

Subsequently, the resist film 81A is removed. Thus, as shown in FIG. 7G, the silicon substrate 102A is in the state in which the upper surface thereof is covered by the nitride film 71A, and the lower surface thereof is covered by the nitride film 72.

The method of removing the resist film 81A is not particularly limited, and there can be cited, for example, washing with sulfuric acid and $O_2$ ashing.

—B6—

Figure 8A:
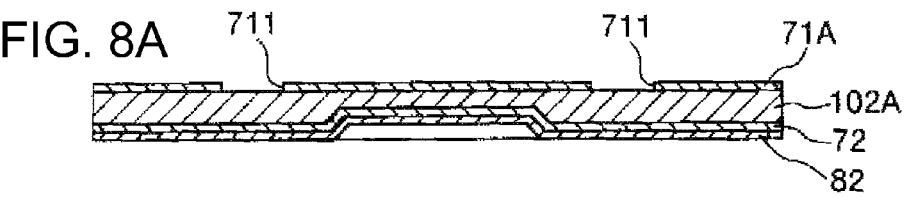
FIGS. 8A through 8G are cross-sectional views for explaining the method of manufacturing the light scanner shown in FIG. 1.

Subsequently, as shown in FIG. 8A, a resist film 82 is formed on the nitride film 72.

The resist film 82 is formed of a positive or negative resist material.

—B7—

Figure 8B:
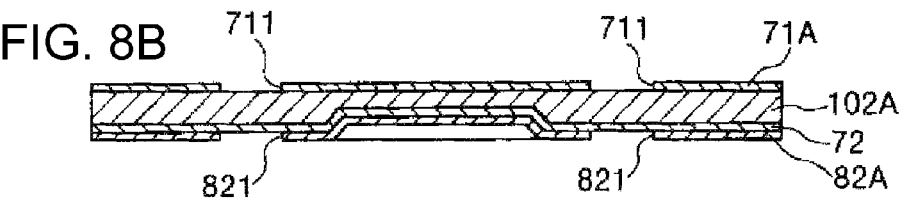

Subsequently, by exposing and then developing the resist film 82, the resist film 82 is partially removed so that there remain the parts of the resist film 82 respectively corresponding to forming areas of the movable plate 21, the support section 22, and the pair of connecting sections 23, 24. Thus, as shown in FIG. 8B, the resist film 82A having openings 821 is obtained. It should be noted that although not shown in FIG. 8B, the resist film 82A is also provided with an opening formed corresponding to the gap between the lower ends of the pair of beam members 231, 232.

—B8—

Figure 8C:
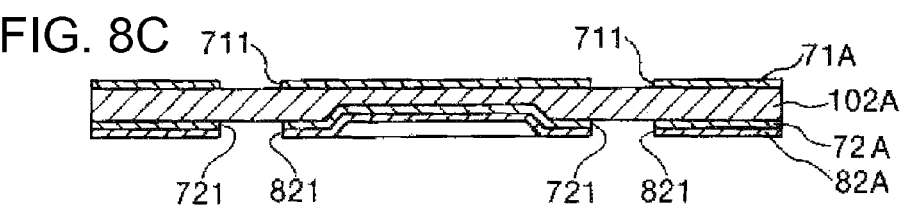

Subsequently, the nitride film 72 is partially removed by etching using the resist film 82A as a mask. Thus, as shown in FIG. 8C, the nitride film 72A having openings 721 is obtained. It should be noted that although not shown in FIG. 8C, the nitride film 72A is also provided with an opening formed corresponding to the gap between the lower ends of the pair of beam members 231, 232.

The etching process (the method of forming the openings 721) is not particularly limited, and there can be cited, for example, reactive ion etching (RIE), and dry etching using $CF_4$ similarly to the process A5 described above.

—B9—

Figure 8D:
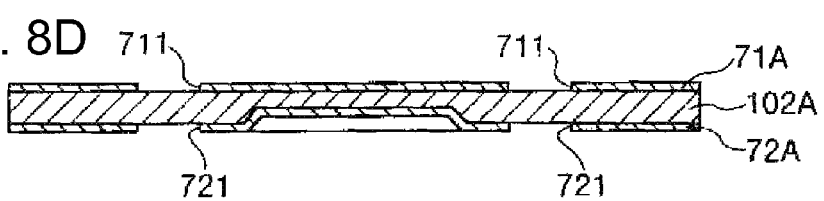

Subsequently, the resist film 82A is removed. Thus, as shown in FIG. 8D, the silicon substrate 102A is in the state in which the upper surface thereof is covered by the nitride film 71A, and the lower surface thereof is covered by the nitride film 72A.

The method of removing the resist film 82A is not particularly limited, and there can be cited, for example, washing with sulfuric acid and $O_2$ ashing.

—B10—

Figure 8E:
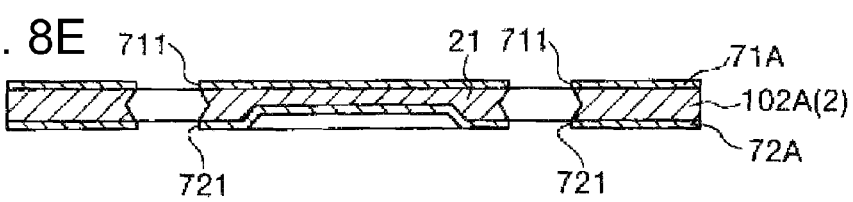

Subsequently, the silicon substrate 102A is anisotropically etched using the nitride films 71A, 72A as masks. Thus, as shown in FIG. 8E, the substrate 2 is obtained. In other words, in the anisotropic etching of the present process, the movable plate 21, the support section 22, and the pair of connecting sections 23, 24 are formed by anisotropically etching the silicon substrate 102A from the both sides thereof via the nitride film 72A as a first mask and the nitride film 71A as a second mask.

The anisotropic etching (the method of forming the substrate 2) is not particularly limited, and can be realized by wet etching using, for example, a KOH solution.

—B11—

Figure 8F:
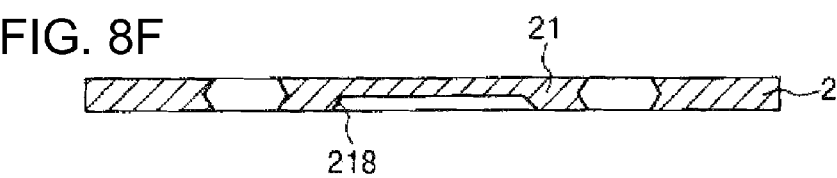

Subsequently, the nitride films 71A, 72A are removed. Thus, as shown in FIG. 8F, there is obtained the state in which the upper surface and the lower surface of the substrate 2 are exposed.

The method of removing the nitride films 71A, 72A is not particularly limited, and there can be cited, for example, reactive ion etching (RIE), and dry etching using $CF_4$ similarly to the process A5 described above, and in addition, a wet process using hot phosphoric acid can also be cited.

Further, a process of rounding the corners of the substrate 2 is performed if necessary.

Such a process (the rounding process) is not particularly limited, and there can be cited, for example, isotropic etching using hydrofluoric acid, nitric acid, and acetic acid (or water), and heat treatment (under reduced pressure, at approx. 1000-1200° C., under Ar atmosphere with $H_2$ introduced).

Figure 8G:
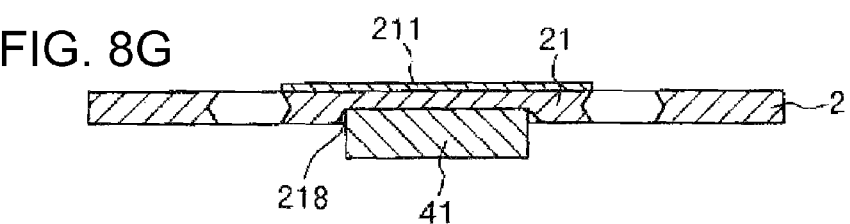

Subsequently, as shown in FIG. 8G, the permanent magnet 41 is fixed onto the lower surface of the movable plate 21 via an adhesive. It should be noted that it is also possible to fix a hard magnetic material onto the lower surface of the movable plate 21 via an adhesive, and then magnetize the hard magnetic material to thereby form the permanent magnet 41.

Further, a metal film is formed on the upper surface of the movable plate 21 to thereby form the light reflecting section 211. The method of forming the metal film is not particularly limited, and there can be cited a dry plating method such as vacuum evaporation, sputtering (low-temperature sputtering), or ion plating, a wet plating method such as electrolytic plating or electroless plating, flame spray coating, and bonding of metal foil.

Further, although not shown in the drawings, the coil 42 is disposed on the support member 3, and then the support member 3 and the substrate 2 are bonded to each other.

The light scanner 1 can be obtained through the processes described above.

According to the light scanner 1 (the actuator) according to the first embodiment described hereinabove, since the movable plate 21 has the cross shape in the plan view, it is possible to reduce the inertia moment of the movable plate 21 when swinging while keeping the light reflecting area of the movable plate 21.

Further, by anisotropically etching the silicon substrate, the movable plate 21 having such a planar shape can be formed with ease and accuracy.

Further, since the movable plate 21 can be reinforced by the permanent magnet 41, the dynamic deflection of the movable plate 21 can be suppressed in this regard.

In particular, since the planar shape viewed from the thickness direction of the movable plate 21 forms the cross shape, even if the displacement of the permanent magnet 41 with respect to the movable plate 21 occurs, the influence exerted by the displacement on the dynamic deflection of the movable plate 21 can be reduced.

Second Embodiment

Figure 9:
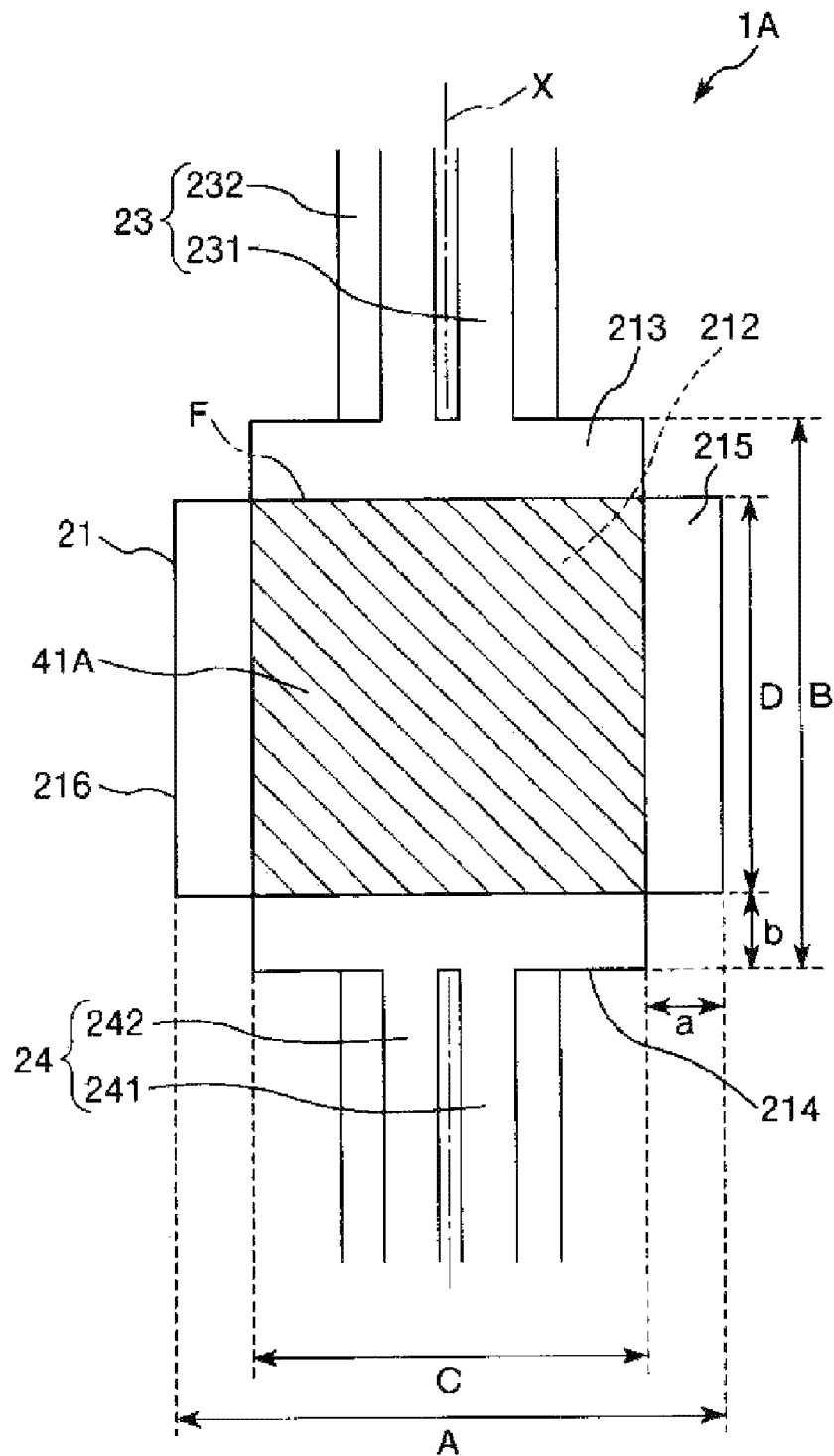
FIG. 9 is a backside view for explaining a movable plate and a magnet of a light scanner (an actuator) according to a second embodiment of the invention.

Then, a second embodiment of the invention will be explained. FIG. 9 is a backside view for explaining a movable plate and a magnet of a light scanner (an actuator) according to the second embodiment of the invention.

Hereinafter, the light scanner according to the second embodiment will be described with a focus mainly on the differences from the light scanner according to the first embodiment described above, and the explanation regarding substantially the same matters will be omitted.

The light scanner according to the second embodiment is roughly the same as the light scanner 1 according to the first embodiment except the point that the shape and the size of the magnet are different. It should be noted that the constituents substantially the same as those of the first embodiment described above are denoted by the same reference symbols. As shown in FIG. 9, the light scanner 1A according to the present embodiment has a permanent magnet 41A bonded to the plate surface of the movable plate 21.

Here, assuming that the length of the movable plate 21 in a direction perpendicular to the axis line X in the plan view from the thickness direction of the movable plate 21 is A, the length of each of the projecting portions 215, 216 in a direction perpendicular to the axis line X in the plan view from the thickness direction of the movable plate 21 is "a," and the length of the permanent magnet 41A in a direction perpendicular to the axis line X in the plan view from the thickness direction of the movable plate 21 is C, the relationship of C=A−2a is fulfilled in the present embodiment. Thus, in the case of bonding the permanent magnet 41A to the movable plate 21 with an adhesive while providing the large area of the permanent magnet 41A in the plan view to thereby improve the driving efficiency, it is possible to prevent the adhesive from running off onto the side surface of each of the projecting portions 215, 216 and the surface on the opposite side to the permanent magnet 41A. Further, the dynamic deflection of the movable plate 21 can more effectively be reduced.

Further, assuming that the length of the movable plate 21 in a direction parallel to the axis line X in the plan view from the thickness direction of the movable plate 21 is B, the length of each of the projecting portions 213, 214 in a direction parallel to the axis line X in the plan view from the thickness direction of the movable plate 21 is "b," and the length of the permanent magnet 41A in a direction parallel to the axis line X in the plan view from the thickness direction of the movable plate 21 is D, the relationship of D=B−2b is fulfilled in the present embodiment.

Thus, in the case of bonding the permanent magnet 41A to the movable plate 21 with an adhesive while providing the large area of the permanent magnet 41A in the plan view to thereby improve the driving efficiency, it is possible to prevent the adhesive from running off to each of the connecting sections 23, 24. Further, the dynamic deflection of the movable plate 21 can more effectively be reduced.

According also to the light scanner 1A of the second embodiment as explained hereinabove, it is possible to reduce the inertia moment of the movable plate 21 when swinging while keeping the light reflecting area, and at the same time to easily make the dimensional accuracy of the movable plate 21 excellent.

Third Embodiment

Figure 10:
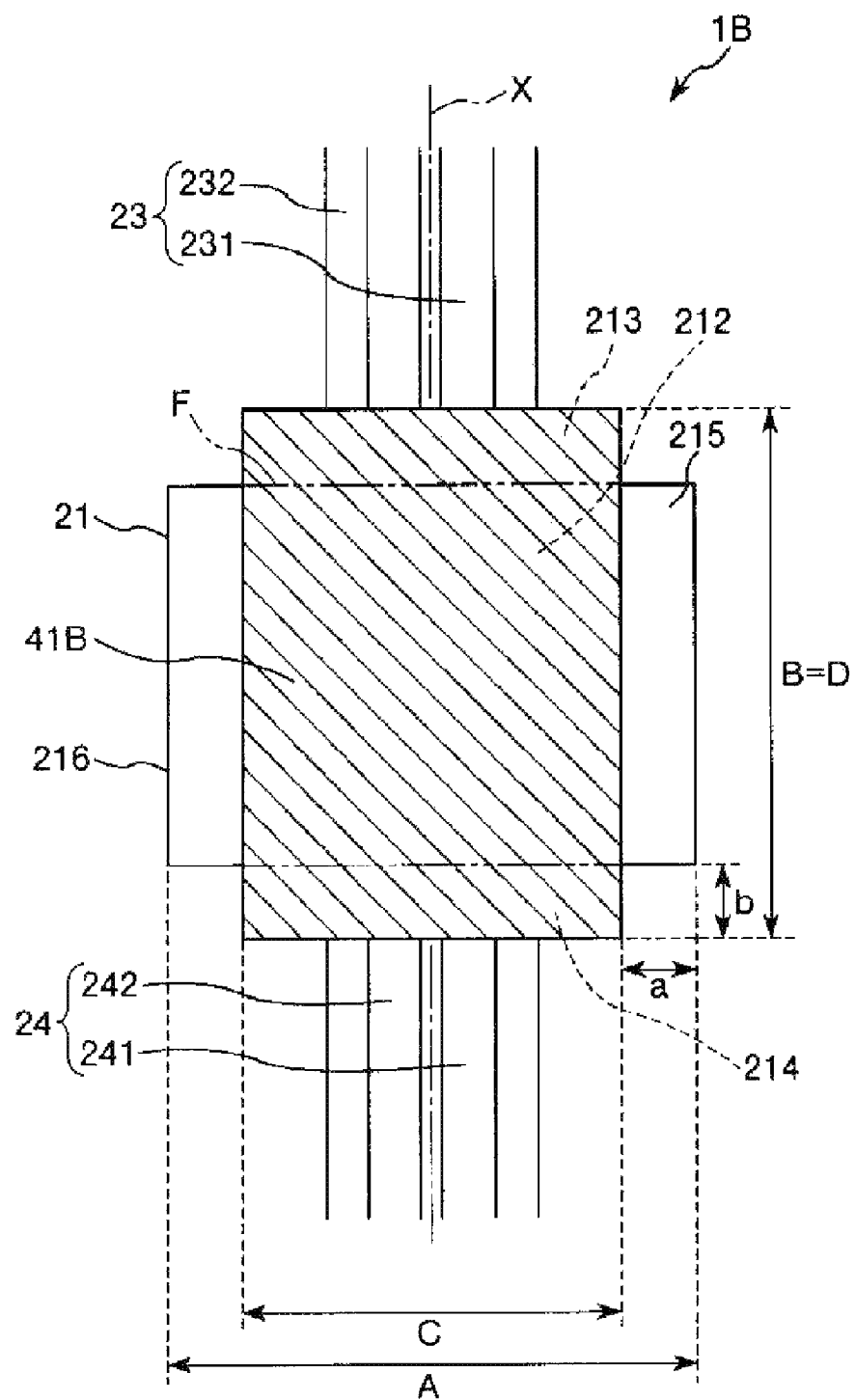
FIG. 10 is a backside view for explaining a movable plate and a magnet of a light scanner (an actuator) according to a third embodiment of the invention.

Then, a third embodiment of the invention will be explained. FIG. 10 is a backside view for explaining a movable plate and a magnet of a light scanner (an actuator) according to the third embodiment of the invention.

Hereinafter, the light scanner according to the third embodiment will be described with a focus mainly on the differences from the light scanner according to the first embodiment described above, and the explanation regarding substantially the same matters will be omitted.

The light scanner according to the third embodiment is roughly the same as the light scanner 1 according to the first embodiment except the point that the shape and the size of the magnet are different. It should be noted that the constituents substantially the same as those of the first embodiment described above are denoted by the same reference symbols. As shown in FIG. 10, the light scanner 1B according to the present embodiment has a permanent magnet 41B bonded to the plate surface of the movable plate 21.

Here, assuming that the length of the movable plate in a direction perpendicular to the axis line X in the plan view from the thickness direction of the movable plate 21 is A, the length of each of the projecting portions 215, 216 in a direction perpendicular to the axis line X in the plan view from the thickness direction of the movable plate 21 is "a," and the length of the permanent magnet 41B in a direction perpendicular to the axis line X in the plan view from the thickness direction of the movable plate 21 is C, the relationship of C=A−2a is fulfilled in the present embodiment. Thus, in the case of bonding the permanent magnet 41B to the movable plate 21 with an adhesive while providing the large area of the permanent magnet 41B in the plan view to thereby improve the driving efficiency, it is possible to prevent the adhesive from running off onto the side surface of each of the projecting portions 215, 216 and the surface on the opposite side to the permanent magnet 41B. Further, the dynamic deflection of the movable plate 21 can more effectively be reduced.

Further, assuming that the length of the movable plate 21 in a direction parallel to the axis line X in the plan view from the thickness direction of the movable plate 21 is B, the length of each of the projecting portions 213, 214 in a direction parallel to the axis line X in the plan view from the thickness direction of the movable plate 21 is "b," and the length of the permanent magnet 41B in a direction parallel to the axis line X in the plan view from the thickness direction of the movable plate 21 is D, the relationship of D≥B−2b is fulfilled. Thus, the dynamic deflection of the movable plate 21 can more effectively be reduced. In particular, in the present embodiment, since the relationship of D=B is fulfilled, the dynamic deflection of the movable plate 21 can be reduced with extreme effect.

According also to the light scanner 1B of the third embodiment as explained hereinabove, it is possible to reduce the inertia moment of the movable plate 21 when swinging while keeping the light reflecting area, and at the same time to easily make the dimensional accuracy of the movable plate 21 excellent.

Fourth Embodiment

Figure 11:
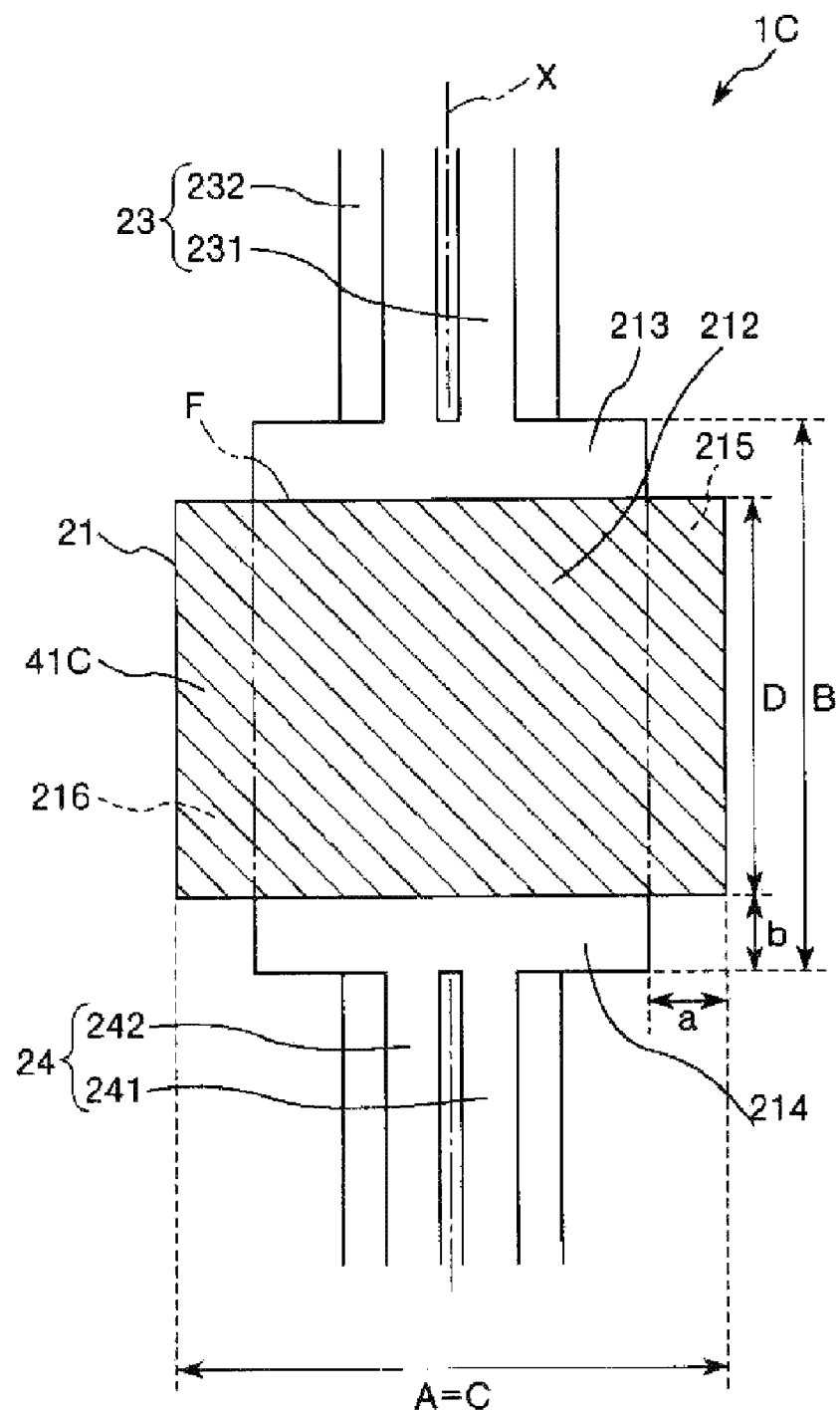
FIG. 11 is a backside view for explaining a movable plate and a magnet of a light scanner (an actuator) according to a fourth embodiment of the invention.

Then, a fourth embodiment of the invention will be explained. FIG. 11 is a backside view for explaining a movable plate and a magnet of a light scanner (an actuator) according to the fourth embodiment of the invention.

Hereinafter, the light scanner according to the fourth embodiment will be described with a focus mainly on the differences from the light scanner according to the first embodiment described above, and the explanation regarding substantially the same matters will be omitted.

The light scanner according to the fourth embodiment is roughly the same as the light scanner 1 according to the first embodiment except the point that the shape and the size of the magnet are different. It should be noted that the constituents substantially the same as those of the first embodiment described above are denoted by the same reference symbols. As shown in FIG. 11, the light scanner 1C according to the present embodiment has a permanent magnet 41C bonded to the plate surface of the movable plate 21.

Here, assuming that the length of the movable plate 21 in a direction perpendicular to the axis line X in the plan view from the thickness direction of the movable plate 21 is A, and the length of the permanent magnet 41C in a direction perpendicular to the axis line X in the plan view from the thickness direction of the movable plate 21 is C, the relationship of A=C is fulfilled.

Further, assuming that the length of the movable plate 21 in a direction parallel to the axis line X in the plan view from the thickness direction of the movable plate 21 is B, the length of each of the projecting portions 213, 214 in a direction parallel to the axis line X in the plan view from the thickness direction of the movable plate 21 is "b," and the length of the permanent magnet 41C in a direction parallel to the axis line X in the plan view from the thickness direction of the movable plate 21 is D, the relationship of D≤B−2b is fulfilled. Thus, in the case of bonding the permanent magnet 41C to the movable plate 21 with an adhesive, it is possible to prevent the adhesive from running off to each of the connecting sections. In particular, in the present embodiment, since the relationship of D=B−2b is fulfilled, it is possible to provide the large area of the permanent magnet 41C in the plan view to thereby improve the driving efficiency, and at the same time to effectively reduce the dynamic deflection of the movable plate 21.

According also to the light scanner 1C of the fourth embodiment as explained hereinabove, it is possible to reduce the inertia moment of the movable plate 21 when swinging while keeping the light reflecting area, and at the same time to easily make the dimensional accuracy of the movable plate 21 excellent. The light scanner explained hereinabove can preferably be applied to an image forming device such as a projector, a laser printer, an imaging display, a barcode reader, or a scanning confocal microscope. As a result, the image forming device having superior drawing characteristics can be provided.

Image Forming Device

Here, an image forming device according to an embodiment of the invention will be explained.

Projector

Figure 12:
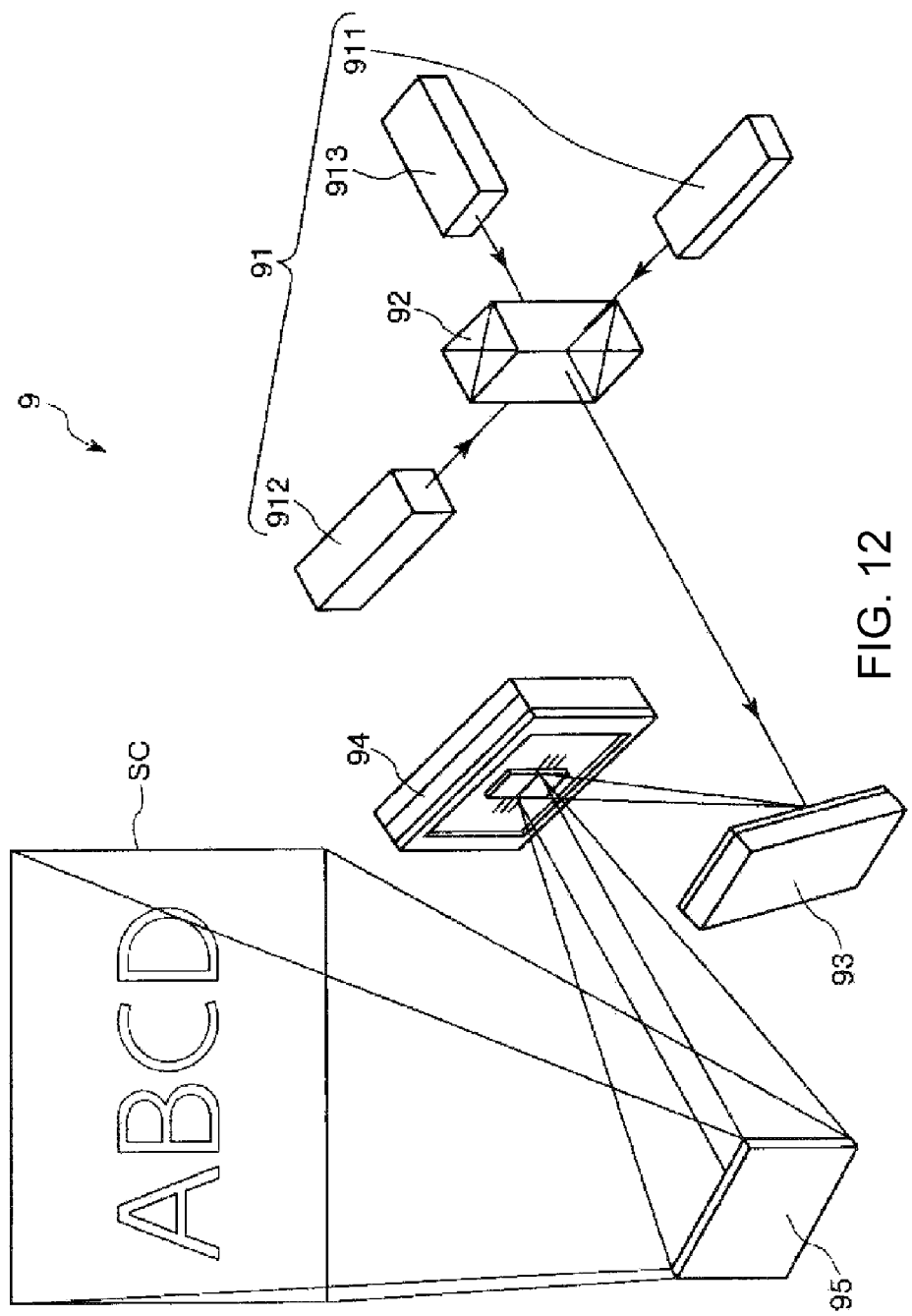
FIG. 12 is a schematic diagram showing an image forming device (a projector) according to an embodiment of the invention.

FIG. 12 is a schematic diagram showing an image forming device (a projector) according to an embodiment of the invention. It should be noted that the longitudinal direction of the screen SC is referred to as a "lateral direction," and a direction perpendicular to the longitudinal direction is referred to as a "vertical direction" for the sake of convenience of explanation.

The projector 9 shown in FIG. 12 has a light source device 91 for emitting light such as a laser, a cross dichroic prism 92, a pair of light scanners 93, 94 (e.g., the light scanners each having substantially the same configuration as that of the light scanner 1) according to the embodiment of the invention, and a stationary mirror 95.

The light source device 91 is provided with a red light source device 911 for emitting red light, a blue light source device 912 for emitting blue light, and a green light source device 913 for emitting green light.

The cross dichroic prism 92 is an optical element composed of four rectangular prisms bonded to each other, and for combining the lights emitted respectively from the red light source device 911, the blue light source device 912, and the green light source device 913 with each other.

Such a projector 9 is configured so that the lights emitted respectively from the red light source device 911, the blue light source device 912, and the green light source device 913 based on image information from a host computer not shown are combined with each other by the cross dichroic prism 92, and the light thus combined is scanned by the light scanners 93, 94, and is then reflected by the stationary mirror 95, and thus forms a color image on the screen SC.

Here, the light scanning by the light scanners 93, 94 will specifically be explained.

Firstly, the light combined by the cross dichroic prism 92 is scanned (main scanning) in a lateral direction by the light scanner 93. Then, the light thus scanned in the lateral direction is further scanned (sub-scanning) in a vertical direction by the light scanner 94. Thus, a two-dimensional color image can be formed on the screen SC. By using the light scanner according to the embodiment of the invention as such light scanners 93, 94, extremely superior drawing characteristics can be exerted.

It should be noted that the projector 9 is not limited thereto providing it is configured so as to scan the light with the light scanner to thereby form the image on the object, and the stationary mirror 95, for example, can be eliminated.

According to the projector 9 configured as described above, since the light scanners 93, 94 each having substantially the same configuration as that of the light scanner 1 described above is provided, a high-quality image can be obtained at low cost.

Head-Up Display

Figure 13:
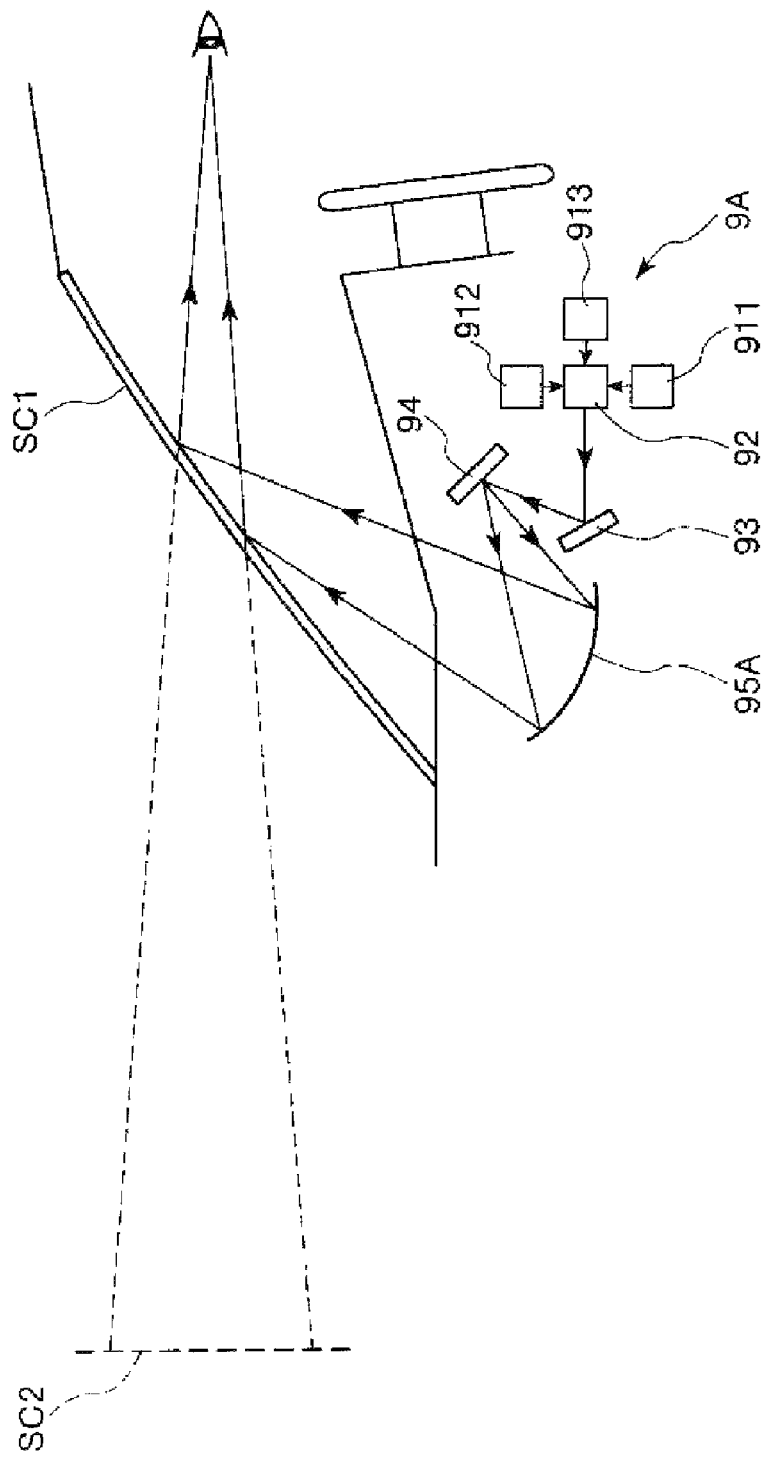
FIG. 13 is a schematic diagram showing an image forming device (a head-up display) according to an embodiment of the invention.

FIG. 13 is a schematic diagram showing an image forming device (a head-up display) according to an embodiment of the invention. It should be noted that the explanation regarding the constituents substantially the same as those of the projector 9 described above will hereinafter be omitted.

The head-up display 9A shown in FIG. 13 is a device for projecting a variety of types of information on a front window SC1 in a mobile object such as a car or an airplane.

The head-up display 9A has the red light source device 911, the blue light source device 912, the green light source device 913, a cross dichroic prism 92, the pair of light scanners 93, 94 according to the embodiment of the invention, and a stationary mirror 95A.

Here, the stationary mirror 95A is a concave mirror, and projects the light from the light scanner 94 on the front window SC1. Then, the operator of the mobile object can visually recognize the displayed image on a virtual screen SC2 located in front of the front window SC1 as a virtual image.

Although the actuator, the light scanner, and the image forming device according to the embodiment of the invention are hereinabove explained based on the embodiments shown in the drawings, the invention is not limited to these embodiments. For example, in the actuator, the light scanner, and the image forming device according to the invention, the configuration of any part can be replaced with an arbitrary configuration exerting substantially the same function, and further, it is also possible to add an arbitrary configuration.

Further, although in the embodiments described above there is explained the case in which the movable plate has a shape symmetric about at least one of the swing axis and the line segment perpendicular thereto in the plan view, the invention is not limited thereto, but it is also possible for the movable plate to have a shape asymmetric about both of the swing axis and the line segment perpendicular thereto in the plan view.

Further, although in the embodiments described above, the explanation is presented taking the case in which the actuator according to the invention to the light scanner as an example, the application of the actuator is not limited thereto, and the actuator according to the invention can also be applied to other optical devices such as an optical switch or an optical attenuator.

Further, although in the embodiments described above, the explanation is presented taking the case in which each of the connecting sections for connecting the movable section and the support section to each other is composed of the pair of beam members as an example, the invention is not limited thereto, and each of the connecting sections can be formed of a single beam member or can be composed of three or more beam members. Even in the case in which, for example, each of the connecting sections is formed of a single beam member, assuming that the cross-section of the beam member forms a trapezoidal shape, the connecting sections can be formed with accuracy by etching the (100) silicon substrate similarly to the embodiments described above.

Further, although in the embodiments described above there is explained the case in which each of the connecting sections has an elongated shape extending in parallel to the swing axis of the movable section, the invention is not limited thereto, and it is also possible for each of the connecting sections to form a shape having at least apart or a place bent or curved in the midpoint between the ends thereof.

Further, although in the embodiments described above, there is explained the case in which the magnet has a rectangular shape in the plan view from the thickness direction of the movable section, the planar shape of the magnet is not limited thereto, but can be, for example, a circular shape, an elliptical shape, and a polygonal shape with the number of vertexes equal to or greater than five.

Further, although in the embodiments described above, there is explained the case in which the number of magnets bonded to the movable section is one, the number of magnets bonded to the movable section is not limited thereto, but can be a plural number.

The entire disclosure of Japanese Patent Application No. 2011-171718, filed Aug. 5, 2011 is expressly incorporated by reference herein.

What is claimed is:

1. An actuator comprising:
a movable section swinging around a swing axis;
a connecting section extending from the movable section, and being torsionally deformed in accordance with swing of the movable section;
a support section supporting the connecting section;
a magnet being disposed on a plate surface of the movable section; and
a coil generating a magnetic field acting on the magnet to thereby swing the movable section,
wherein the movable section has a cross shape in a plan view.

2. The actuator according to claim 1 wherein
the movable section has the cross shape having
a pair of first projecting portions projecting to both sides in a direction perpendicular to the swing axis, and
a pair of second projecting portions projecting to both sides in a direction parallel to the swing axis in the plan view, and
assuming that
a length of the movable section in a direction perpendicular to the swing axis in the plan view is A,
a length of each of the first projecting portions in a direction perpendicular to the swing axis in the plan view is "a," and
a length of the magnet in a direction perpendicular to the swing axis in the plan view is C,
a relationship of $C \geq (A-2a)/4$ is fulfilled.

3. The actuator according to claim 2 wherein
a relationship of $C \leq A-2a$ is fulfilled.

4. The actuator according to claim 1 wherein
assuming that
a length of the movable section in a direction parallel to the swing axis in the plan view is B,
a length of each of the second projecting portions in a direction parallel to the swing axis in the plan view is "b," and
a length of the magnet in a direction parallel to the swing axis in the plan view is D,
a relationship of $D \geq (B-2b)/8$ is fulfilled.

5. The actuator according to claim 4 wherein
a relationship of $D \leq B-2b$ is fulfilled.

6. The actuator according to claim 4 wherein
a relationship of $D \geq B-2b$ is fulfilled.

7. The actuator according to claim 2 wherein
the magnet has a rectangular shape including a pair of sides parallel to the swing axis and a pair of sides perpendicular to the swing axis in the plan view of the movable section.

8. The actuator according to claim 1 wherein
an outer shape of the movable section in the plan view is composed mainly of
line segments parallel to the swing axis, and
line segments perpendicular to the swing axis.

9. The actuator according to claim 1 wherein
the movable section, the support section, and the connecting section are formed of an anisotropically etched silicon substrate.

10. The actuator according to claim 9 wherein
the plate surface of the movable section is formed of a (100) plane of silicon.

11. A light scanner comprising:
a light reflecting section having a light reflectivity;
a movable section having the light reflecting section, and swinging around a swing axis;
a connecting section extending from the movable section, and being torsionally deformed in accordance with swing of the movable section;
a support section supporting the connecting section;
a magnet being disposed on a plate surface of the movable section; and
a coil generating a magnetic field acting on the magnet to thereby swing the movable section,
wherein the movable section has a cross shape in a plan view.

12. The light scanner according to claim 11 wherein
the movable section has the cross shape having
a pair of first projecting portions projecting to both sides in a direction perpendicular to the swing axis, and
a pair of second projecting portions projecting to both sides in a direction parallel to the swing axis in the plan view, and
assuming that
a length of the movable section in a direction perpendicular to the swing axis in the plan view is A,
a length of each of the first projecting portions in a direction perpendicular to the swing axis in the plan view is "a," and
a length of the magnet in a direction perpendicular to the swing axis in the plan view is C,
a relationship of $C \geq (A-2a)/4$ is fulfilled.

13. The light scanner according to claim 12 wherein
a relationship of $C \leq A-2a$ is fulfilled.

14. The light scanner according to claim 11 wherein
assuming that
a length of the movable section in a direction parallel to the swing axis in the plan view is B,
a length of each of the second projecting portions in a direction parallel to the swing axis in the plan view is "b," and
a length of the magnet in a direction parallel to the swing axis in the plan view is D,
a relationship of $D \geq (B-2b)/8$ is fulfilled.

15. The light scanner according to claim 14 wherein
a relationship of $D \leq B-2b$ is fulfilled.

16. An image forming device comprising:
a light source emitting light; and
a light scanner scanning the light from the light source,
wherein the light scanner includes
a light reflecting section having a light reflectivity,
a movable section having the light reflecting section, and swinging around a swing axis,
a connecting section extending from the movable section, and being torsionally deformed in accordance with swing of the movable section,
a support section supporting the connecting section,
a magnet being disposed on a plate surface of the movable section, and
a coil generating a magnetic field acting on the magnet to thereby swing the movable section, and
the movable section has a cross shape in a plan view.

17. The image forming device according to claim 16 wherein
the movable section has the cross shape having
a pair of first projecting portions projecting to both sides in a direction perpendicular to the swing axis, and a pair of second projecting portions projecting to both sides in a direction parallel to the swing axis in the plan view, and assuming that a length of the movable section in a direction perpendicular to the swing axis in the plan view is A, a length of each of the first projecting portions in a direction perpendicular to the swing axis in the plan view is "a," and a length of the magnet in a direction perpendicular to the swing axis in the plan view is C, a relationship of $C \geq (A-2a)/4$ is fulfilled.

18. The image forming device according to claim 17 wherein a relationship of $C \leq A-2a$ is fulfilled.

19. The image forming device according to claim 16 wherein assuming that a length of the movable section in a direction parallel to the swing axis in the plan view is B, a length of each of the second projecting portions in a direction parallel to the swing axis in the plan view is "b," and a length of the magnet in a direction parallel to the swing axis in the plan view is D, a relationship of $D \geq (B-2b)/8$ is fulfilled.

20. The image forming device according to claim 19 wherein a relationship of $D \leq B-2b$ is fulfilled.

* * * * *